(12) United States Patent
Raszkowski et al.

(10) Patent No.: US 11,231,119 B2
(45) Date of Patent: Jan. 25, 2022

(54) CLUTCH APPLY CAVITY AIR BLEED

(71) Applicant: Allison Transmission, Inc., Indianapolis, IN (US)

(72) Inventors: James Raszkowski, Indianapolis, IN (US); Thinh Nguyen, Carmel, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 244 days.

(21) Appl. No.: 16/365,836

(22) Filed: Mar. 27, 2019

(65) Prior Publication Data

US 2019/0301623 A1 Oct. 3, 2019

Related U.S. Application Data

(60) Provisional application No. 62/649,167, filed on Mar. 28, 2018.

(51) Int. Cl.
| | |
|---|---|
| *F16D 25/12* | (2006.01) |
| *F16K 15/04* | (2006.01) |
| *F16D 25/10* | (2006.01) |
| *F16D 25/0638* | (2006.01) |
| *F16H 3/66* | (2006.01) |
| *F16D 48/02* | (2006.01) |

(52) U.S. Cl.
CPC ........ *F16K 15/044* (2013.01); *F16D 25/0638* (2013.01); *F16D 25/10* (2013.01); *F16D 25/12* (2013.01); *F16D 2048/0224* (2013.01); *F16D 2048/0263* (2013.01); *F16H 3/66* (2013.01); *F16H 2200/2012* (2013.01); *F16H 2200/2046* (2013.01)

(58) Field of Classification Search
CPC ............... Y10T 137/7869; F16K 17/30; F16D 2048/0224; F16D 2048/0263
See application file for complete search history.

(56) References Cited

U.S. PATENT DOCUMENTS

| | | | |
|---|---|---|---|
| 2,740,512 A | 4/1956 | Fischer | |
| 2,954,040 A | 9/1960 | Bolster | |
| 3,845,785 A * | 11/1974 | McMath | F16K 17/30 137/517 |

(Continued)

FOREIGN PATENT DOCUMENTS

| | | | |
|---|---|---|---|
| EP | 3236061 A1 * | 10/2017 | ............. F04B 1/053 |
| WO | WO-2020236853 A1 * | 11/2020 | ............. F16K 1/465 |

*Primary Examiner* — Kevin F Murphy
(74) *Attorney, Agent, or Firm* — Faegre Drinker Biddle & Reath LLP

(57) ABSTRACT

A check valve assembly for controlling a flow of fluid in a transmission from a first cavity to a second cavity is disclosed. Check valve assembly may include a housing having a fluid passageway therein, a biasing member supported by the housing for axial movement along a first axis, and a valve element positioned within the fluid passageway of the housing. The valve element may be moveable between a seated position and an unseated position. An intersection of a plane normal to the first axis and the valve element defines a seating boundary of the element, which may define a minimum distance from the seating surface of the fluid passageway to the valve element when the valve element is in the unseated position. The check valve may include at least one swage extending radially inwardly from the fluid passageway to limit axial movement of the valve element.

21 Claims, 11 Drawing Sheets

(56) References Cited

U.S. PATENT DOCUMENTS

| | | | | |
|---|---|---|---|---|
| 4,105,044 | A | * | 8/1978 | Davitt .................. F16K 15/026 137/517 |
| 4,421,218 | A | | 12/1983 | Haight |
| 4,830,046 | A | * | 5/1989 | Holt ........................ F16K 17/30 137/460 |
| 4,907,684 | A | | 3/1990 | Breisch |
| 5,441,202 | A | * | 8/1995 | Wintering ............... B05B 14/00 239/267 |
| 6,948,519 | B2 | * | 9/2005 | Cavagna ................ F16K 17/30 137/505.12 |
| 7,178,544 | B2 | * | 2/2007 | Robison ................ F16K 5/0407 137/2 |
| 8,776,637 | B2 | * | 7/2014 | Juhassz ............... F16H 61/0009 74/606 R |
| 2005/0005972 | A1 | * | 1/2005 | Borg .................. F16H 61/0276 137/517 |
| 2011/0147016 | A1 | * | 6/2011 | Blease ................. F16K 17/285 169/17 |

* cited by examiner

CLUTCH APPLY CAVITY AIR BLEED

CROSS-REFERENCE TO RELATED APPLICATIONS

This application claims the benefit of U.S. Provisional Application No. 62/649,167, filed Mar. 28, 2018, the entire disclosure of which is hereby expressly incorporated herein by reference.

FIELD OF THE DISCLOSURE

The present disclosure relates to a check valve assembly for a multi-speed transmission and in particular to a check valve assembly for controlling the flow of fluid in a multi-speed transmission.

BACKGROUND OF THE DISCLOSURE

Known multi-speed planetary transmissions use a plurality of planetary gearsets, interconnectors, selective couplers, and additional elements to achieve a plurality of forward and reverse speed ratios. During or after operation of the multi-speed transmission, air may infiltrate a selective coupler assembly as fluid is drained from the assembly to a sump of the multi-speed transmission. This air may cause a delay in engagement of the selective coupler, as the air must be exhausted prior to engagement. This leads to unpredictability and inconsistency in shifting.

SUMMARY OF THE DISCLOSURE

In an exemplary embodiment of the present disclosure, a check valve assembly for controlling a flow of fluid in a transmission from a first cavity to a second cavity is disclosed. The check valve comprises a housing including a fluid passageway fluidly coupled to the first cavity and the second cavity, a biasing member supported by the housing for axial movement along a first axis, and a valve element positioned within the fluid passageway of the housing and axially moveable between a seated position and an unseated position. When the valve element is in the seated position, the valve element is contacting a seating surface of the fluid passageway and the first cavity is not in fluid communication with the second cavity. When the valve element is in the unseated position, the valve element is spaced apart from the seating surface of the fluid passageway and the first cavity is in fluid communication with the second cavity. Further, an intersection of a plane normal to the first axis and the valve element defines a seating boundary of the valve element. The seating boundary of the valve element defines a minimum distance from the seating surface of the fluid passageway to the valve element when the valve element is in the unseated position and the seating boundary contacts the seating surface of the fluid passageway when the valve element is in the seated position.

In a first example of this exemplary embodiment, the fluid passageway further includes a first flow region and second flow region arranged axially of the first flow region along the first axis in the first axial direction. The first flow region has a first flow area and the second flow region has a second flow area. Further, the minimum distance from seating surface to the valve element defines a flow restriction within the fluid passageway and has a flow restriction area. Each of the first flow area and the second flow area is larger than the flow restriction area. In a variation of this first example, the flow restriction induces a pressure differential between the first flow region and the second flow region when the fluid flow is in the first axial direction.

In another exemplary embodiment of the present disclosure, a fluid controlled selective coupler assembly for selectively fixedly coupling a first transmission component to a second transmission component is disclosed. The fluid controlled selective coupler comprises a selective coupler moveable between an engaged configuration and a disengaged configuration, an actuator assembly including an actuator element operatively coupled to the selective coupler to transition the selective coupler from the disengaged configuration to the engaged configuration, and a check valve assembly coupled to a wall bound the first fluid cavity of the actuator assembly. The selective coupler fixedly couples the first transmission component to the second transmission component when in the engaged configuration. Conversely, the first transmission component may move relative to the second transmission component when the selective coupler is in the disengaged configuration. The actuator assembly transitions the selective coupler due to a movement of the actuator element. The actuator element is received in a first fluid cavity of the actuator assembly for reciprocal movement in the first fluid cavity along a first axis due to a fluid pressure in the first fluid cavity. The check valve assembly includes a housing having a fluid passageway in fluid communication with the first fluid cavity of the actuator assembly and with a second fluid cavity, a biasing member supported by the housing for axial movement along a second axis, and a valve element positioned within the fluid passageway of the housing and axially moveable between a seated position and an unseated position. When the valve element is in the seated position, the valve element contacts a seating surface of the fluid passageway and the fluid cavity is not in fluid communication with the second cavity. When the valve element is in the unseated position, the valve element is spaced apart from the seating surface of the fluid passageway and the fluid cavity is in fluid communication with the second cavity. Further, an intersection of a plane normal to the second axis and the valve element defines a seating boundary of the valve element. The seating boundary of the valve element defines a minimum distance from the seating surface of the fluid passageway to the valve element when the valve element is in the unseated position and the seating boundary contacts the seating surface of the fluid passageway when the valve element is in the seated position. In a first example of this exemplary embodiment, the valve element axially moves to the seated position in response to a seating pressure supplied by the first fluid cavity. The valve element axially moves to the unseated position in response to at least one of an opening pressure supplied by the second fluid cavity or an absence of the seating pressure.

In a further exemplary embodiment of the present disclosure, a check valve assembly for controlling a flow of fluid to a transmission is disclosed. The check valve assembly comprises a housing including a first chamber and a second chamber arranged axially of the first chamber along a first axis of the housing, a biasing member supported by the housing for axial movement along the first axis, a valve element positioned within the first chamber and axially moveable in a first axial direction along the first axis to a seated position and moveable in a second axial direction along the first axis to an unseated position, and at least one swage extending radially inwardly from an interior wall of the first chamber. The second chamber is fluidly coupled to the first chamber, wherein both the first chamber and the second chamber define a fluid passageway of the housing. When the valve element moves to the seated position, the valve element contacts a seating surface of the first chamber. When the valve element moves to the unseated position, the valve element is spaced axially apart from the seating surface. The second axial direction is opposite the first axial direction. The at least one swage is configured to limit axial movement of the valve element along the first axis in the second axial direction.

In a first example of this further exemplary embodiment, the at least one swage includes a radial protrusion extending radially inwardly from the interior wall. The radial protrusion is axially spaced apart from the seating surface and limits axial movement of the valve element along the first axis in the second axial direction. The valve element is arranged axially intermediate the radial protrusion of the at least one swage and the seating surface. In a second example of this further exemplary embodiment, the at least one swage includes a rib extending radially inwardly from the interior wall. The rib limits radial movement of the valve element.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrates exemplary embodiments of the invention and such exemplifications are not to be construed as limiting the scope of the invention in any manner.

DETAILED DESCRIPTION OF THE DRAWINGS

Figure 1:
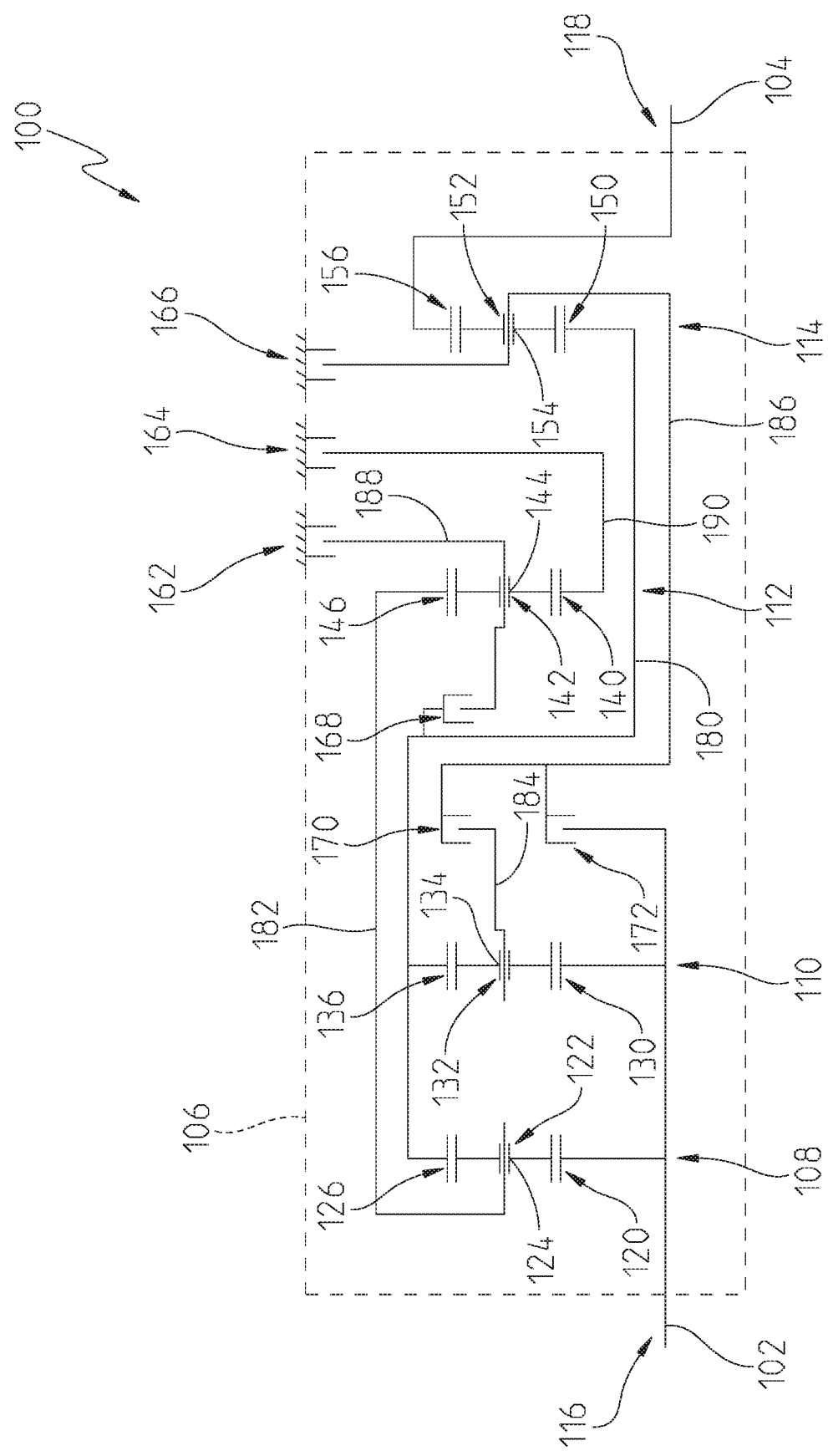
FIG. 1 is a diagrammatic view of an exemplary multi-speed transmission including four planetary gearsets and six selective couplers.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In the exemplary transmission embodiment, torque and rotational motion are transferred from an input member to an output member through a multi-speed transmission. In order to facilitate the transfer of torque and rotational motion to the output member at different selected gear ratios, the multi-speed transmission includes a plurality of operative transmission components. Simply put, an operative transmission component is a device or component that carries torque and rotational motion within the transmission. Operative transmission components illustratively include selective couplers, interconnectors, sun gears, planet carriers, and ring gears.

A clutch is an example of a selective coupler. A clutch couples two or more rotatable transmission components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A second exemplary selective coupler is a brake. A brake couples one or more rotatable transmission components to a stationary component to hold the one or more rotatable components stationary relative to the stationary component in the engaged configuration and to permit rotation of the one or more components relative to the stationary component in the disengaged configuration. Exemplary brakes may be configured as shiftable friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in U.S. Pat. No. 9,625,007, the entirety of which is incorporated by reference.

FIG. 1 is a diagrammatic representation of an exemplary multi-speed transmission 100. Multi-speed transmission 100 includes an input member 102 operatively coupled to an output member 104. Each of input member 102 and output member 104 is rotatable relative to at least one stationary member 106. An exemplary input member 102 is an input shaft or other suitable rotatable component. Input member 102 is rotated by a prime mover. Exemplary prime movers include internal combustion engines, electric motors, hybrid power systems, and other suitable power systems. In one embodiment, the prime mover indirectly rotates the input member through a clutch and/or a torque converter. An exemplary output member 104 is an output shaft or other suitable rotatable component. Output member 104 provides rotational power to one or more working components. Exemplary working components include one or more drive wheels of a motor vehicle, a power take-off shaft, and other suitable devices. Output member 104 is rotated based on the interconnections of the operative transmission components of the transmission 100. By changing the interconnections of the operative transmission components, a rotation speed of output member 104 may be varied from a rotation speed of input member 102. An exemplary stationary member 106 is a housing of multi-speed transmission 100. The housing may include several components coupled together. In the exemplary embodiment of FIG. 1, input member 102 enters stationary member 106 at a first location or end 116 and output member 104 exits stationary member 106 at a second location or end 118.

Multi-speed transmission 100 includes at least one planetary gearset. In the exemplary embodiment of FIG. 1, multi-speed transmission 100 includes a plurality of planetary gearsets, illustratively a first planetary gearset 108, a second planetary gearset 110, a third planetary gearset 112, and a fourth planetary gearset 114. In another embodiment, additional planetary gearsets may be included. Further, although first planetary gearset 108, second planetary gearset 110, third planetary gearset 112, and fourth planetary gearset 114 are illustrated as simple planetary gearsets, it is contemplated that compound planetary gearsets may be included in some embodiments.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156.

Multi-speed transmission 100 further includes a plurality of selective couplers, illustratively a first selective coupler 162, a second selective coupler 164, a third selective coupler 166, a fourth selective coupler 168, a fifth selective coupler 170, and a sixth selective coupler 172. In the illustrated embodiment, first selective coupler 162, second selective coupler 164, and third selective coupler 166 are brakes and fourth selective coupler 168, fifth selective coupler 170, and sixth selective coupler 172 are clutches. The axial locations of the clutches and brakes relative to the plurality of planetary gearsets may be altered from the illustrated axial locations. In alternative embodiments, any number of clutches and brakes may be used.

Multi-speed transmission 100 may be described as having eight interconnectors. Input member 102 is a first interconnector that both provides input torque and rotational motion to multi-speed transmission 100 and fixedly couples sun gear 120 of first planetary gearset 108 to sun gear 130 of second planetary gearset 110. Input member 102 is further fixedly coupled to sixth selective coupler 172. Output member 104 is a second interconnector that provides output torque and rotational motion from multi-speed transmission 100. A third interconnector 180 fixedly couples ring gear 126 of first planetary gearset 108, ring gear 136 of second planetary gearset 110, and sun gear 150 of fourth planetary gearset 114 together. Third interconnector 180 is further fixedly coupled to fourth selective coupler 168. A fourth interconnector 182 fixedly couples planet carrier 122 of first planetary gearset 108 to ring gear 146 of third planetary gearset 112. A fifth interconnector 184 fixedly couples planet carrier 132 of second planetary gearset 110 to fifth selective coupler 170. A sixth interconnector 186 fixedly couples planet carrier 152 of fourth planetary gearset 114, third selective coupler 166, fifth selective coupler 170, and sixth selective coupler 172 together. A seventh interconnector 188 fixedly couples planet carrier 142 of third planetary gearset 112 to first selective coupler 162 and to fourth selective coupler 168. An eighth interconnector 190 fixedly couples sun gear 140 of third planetary gearset 112 to second selective coupler 164.

Multi-speed transmission 100 further includes several components that are illustratively shown as being selectively coupled together through selective couplers. By engaging various combinations of first selective coupler 162, second selective coupler 164, third selective coupler 166, fourth selective coupler 168, fifth selective coupler 170, and sixth selective coupler 172, additional components of multi-speed transmission 100 may be fixedly coupled together. Thus, the plurality of planetary gearsets and the plurality of selective couplers of multi-speed transmission 100 may be interconnected in various arrangements to provide torque and rotational motion from input member 102 to output member 104 in a plurality of forward gear or speed ratios and reverse gear or speed ratios. Thus, a rotation speed of output member 104 may be varied from a rotation speed of input 102. FIG. 1 is a representative view of an exemplary multi-speed transmission. Additional details regarding the exemplary multi-speed transmission are disclosed in U.S. patent application Ser. No. 15/483,027, the entirety of which is incorporated by reference.

Figure 2:
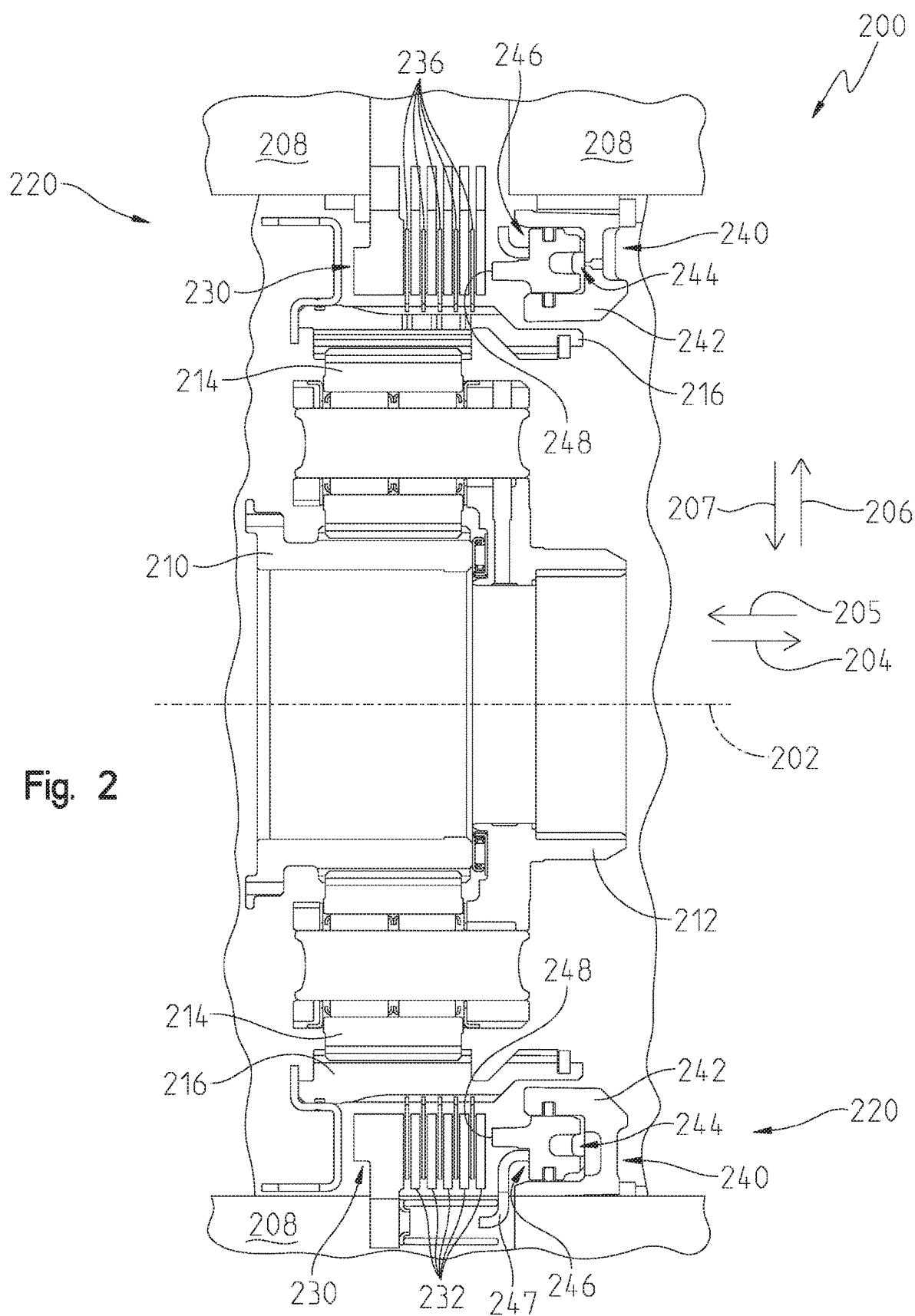
FIG. 2 is a cross-sectional view of an exemplary planetary gearset.

Turning now to FIG. 2, an exemplary planetary gearset 200 coupled to at least one selective coupler assembly 220 is shown. Planetary gearset 200 is configured to rotate about an axis 202 and illustratively includes a sun gear 210, a planet carrier 212 supporting a plurality of planet gears 214, and a ring gear 216. While planetary gearset 200 illustratively comprises a simple planetary gearset, it is contemplated that planetary gearset 200 could comprise a complex planetary gearset. Furthermore, planetary gearset 200 may be coupled to additional transmission components, including other planetary gearsets, as disclosed in connection with FIG. 1.

Ring gear 216 of planetary gearset 200 is operatively coupled to a stationary member 208, illustratively a transmission housing, through selective coupler assembly 220. In the exemplary embodiment of FIG. 2, selective coupler assembly 220 includes a selective coupler 230, illustratively a brake, operatively coupled to an actuator assembly 240. Actuator assembly 240 transitions selective coupler 230 from a disengaged configuration to an engaged configuration in response to a control signal, illustratively an increase in fluid pressure within actuator assembly 240. As a result, ring gear 216 is fixedly coupled to stationary member 208 when selective coupler 230 is in the engaged configuration but is moveable relative to stationary member 208 when selective coupler 230 is in the disengaged configuration.

In the exemplary embodiment of FIG. 2, selective coupler 230 illustratively comprises a clutch pack and includes a plurality of separator plates 232 and a plurality of friction discs 236. Separator plates 232 illustratively alternate with friction discs 236. Separator plates 232 are illustratively coupled to stationary member 208. In an alternative embodiment, friction discs 236 may be coupled to another stationary member. In the exemplary embodiment shown, separator plates 232 comprise steel. In an alternative embodiment, separator plates 232 comprise a material suitable for engaging with friction discs 236.

Outer faces of friction discs 236 include a friction material having a high coefficient of friction bonded thereto. In the exemplary embodiment shown, friction discs 236 are coupled to ring gear 216. Thus, friction discs 236 are rotatable about axis 202 relative to separator plates 232 when selective coupler 230 is in the disengaged configuration. In another alternative embodiment, friction discs 236 are coupled to stationary member 208 and separator plates are coupled to ring gear 216.

Friction discs 236 and separator plates 232 are also axially moveable relative to one another in axial directions 204, 205. When selective coupler 230 is in the engaged configuration, selective coupler 230 is compressed to an extent that separator plates 232 engage with the friction material of the outer faces of friction discs 236. As a result, separator plates 232 are fixedly coupled to friction discs 236 and no longer rotatable about axis 202 relative to friction discs 236. Conversely, when selective coupler 230 is in the disengaged configuration, separator plates 232 are sufficiently spaced apart from friction discs 236 such that separator plates 232 are not engaged with friction discs 236 and are thus rotatable relative to friction discs 236.

Actuator assembly 240 includes a housing 242 and an actuator element 246, illustratively a piston, received within the housing 242 for reciprocal movement in axial directions 204, 205. Actuator assembly 240 is fluidly coupled to a sump and receives fluid within a fluid cavity 244 of the housing 242 from the sump. In the exemplary embodiment of FIG. 2, actuator element 246 is received in fluid cavity 244. As a result, the axial position of actuator element 246 may be controlled based on the fluid pressure of the fluid within fluid cavity 244. In response to an increase in the fluid pressure of the fluid within fluid cavity 244, actuator element 246 is axially displaced in axial direction 205. When actuator element 246 is displaced in axial direction 205, a distal portion of actuator element 246 engages with and compresses separator plates 232 and friction discs 236 and selective coupler 230 is transitioned to the engaged configuration. Conversely, actuator element 246 is axially displaced in axial direction 204 in response to a decrease in the fluid pressure of the fluid within fluid cavity 244. More specifically, selective coupler assembly 220 includes an actuator element biasing member 247, such as a spring member. Exemplary spring members include compression springs, wave springs, and Belleville springs. Actuator element biasing member 247 urges actuator element 246 in axial direction 204 when the fluid pressure of the fluid within fluid cavity 244 is decreased. When actuator element 246 is displaced in axial direction 204, distal portion of actuator element 246 disengages from and is axially spaced apart from separator plates 232 and friction discs 236, and selective coupler 230 is transitioned to the disengaged configuration.

In the exemplary embodiment of FIG. 2, selective coupler assembly 220 is spaced radially apart from axis 202 in a radial direction 206. Specifically, selective coupler assembly 220 is radially adjacent ring gear 216, which is spaced radially nearer axis 200 in a radial direction 207 than selective coupler assembly 220. Because selective coupler assembly 220 could be coupled to another component of planetary gearset 200, the radial position of selective coupler assembly 220 is not fixed to the location illustrated in FIG. 2. Depending upon the component of planetary gearset 200, selective coupler assembly 220 could be positioned along axis 202 or radially between axis 202 and the location illustrated in FIG. 2.

Figure 3A:
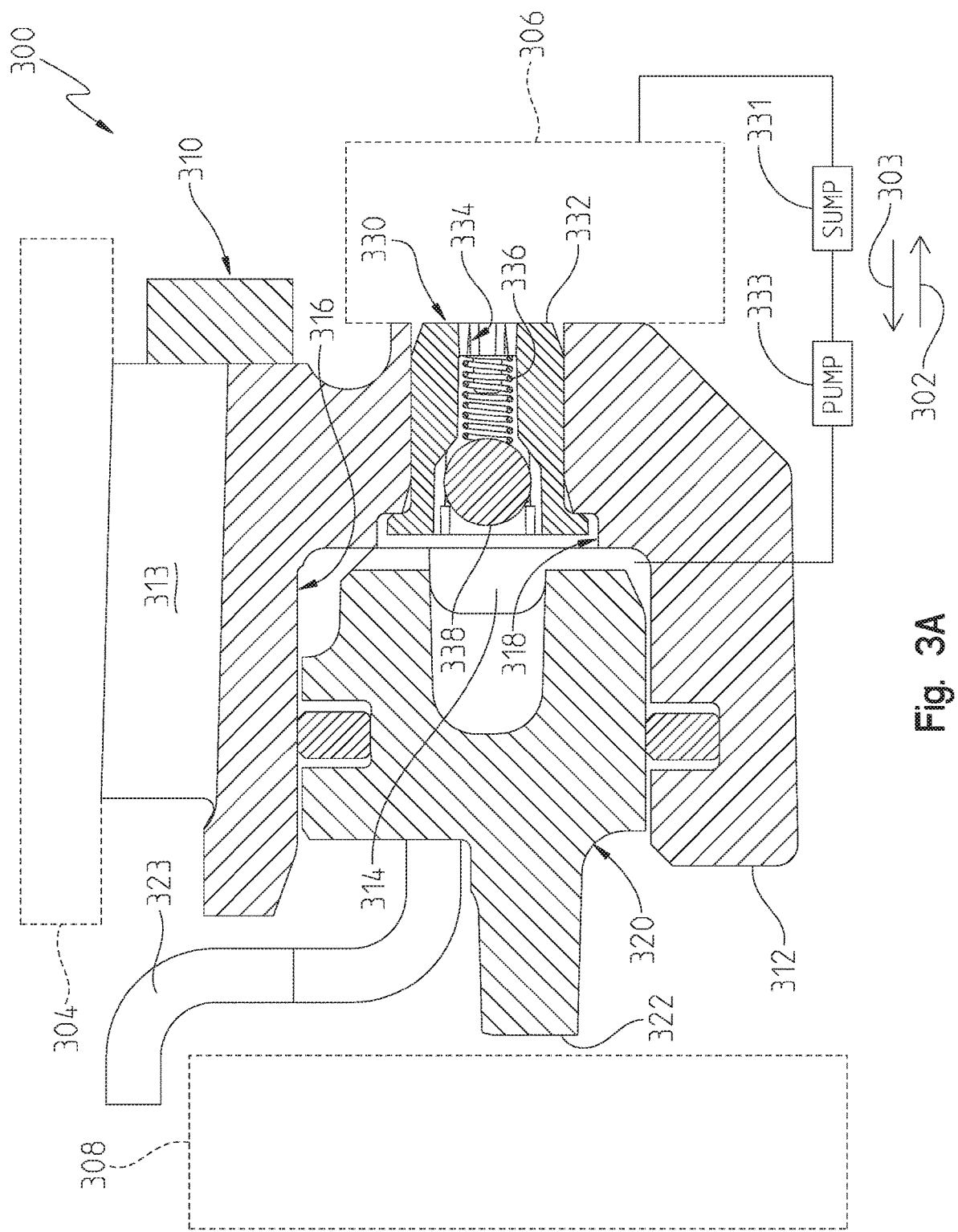
FIG. 3A is a cross-sectional view of an exemplary selective coupler assembly with an exemplary check valve assembly having a valve element in an unseated position.
Figure 3B:
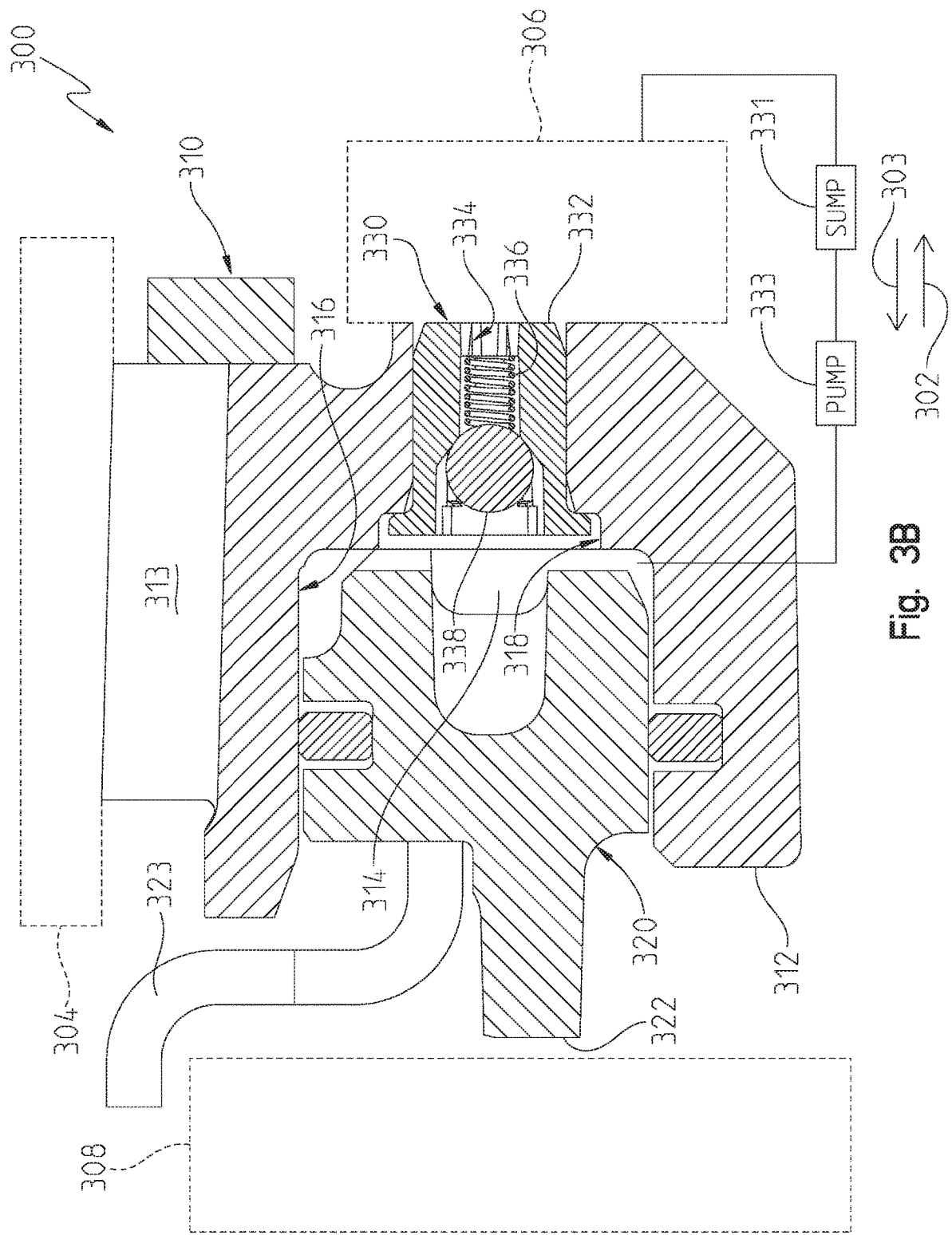
FIG. 3B is a cross-sectional view of the selective coupler assembly of FIG. 3A with the valve element in a seated position.
Figure 4:
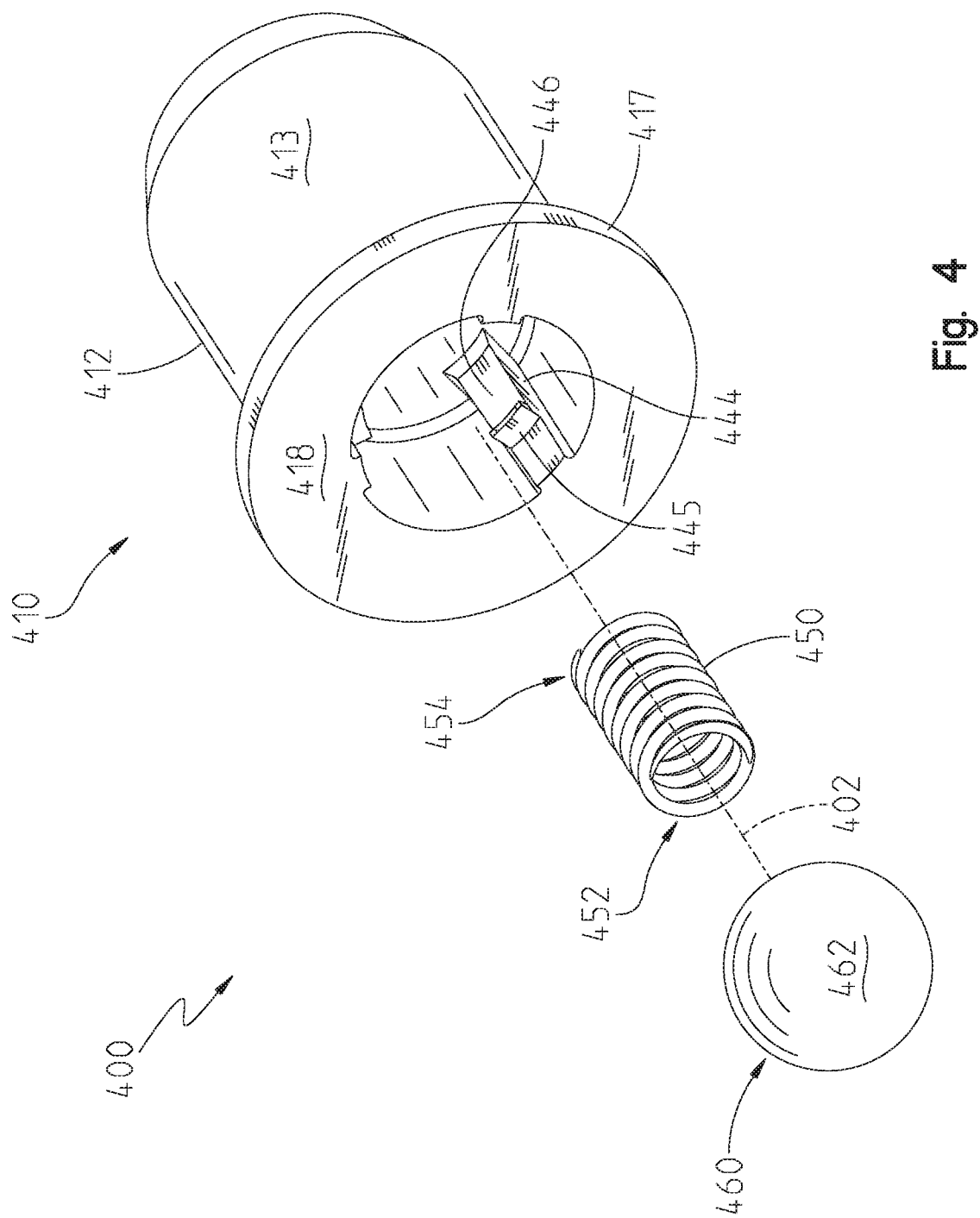
FIG. 4 is an exploded assembly view of the exemplary check valve assembly.
Figure 5:
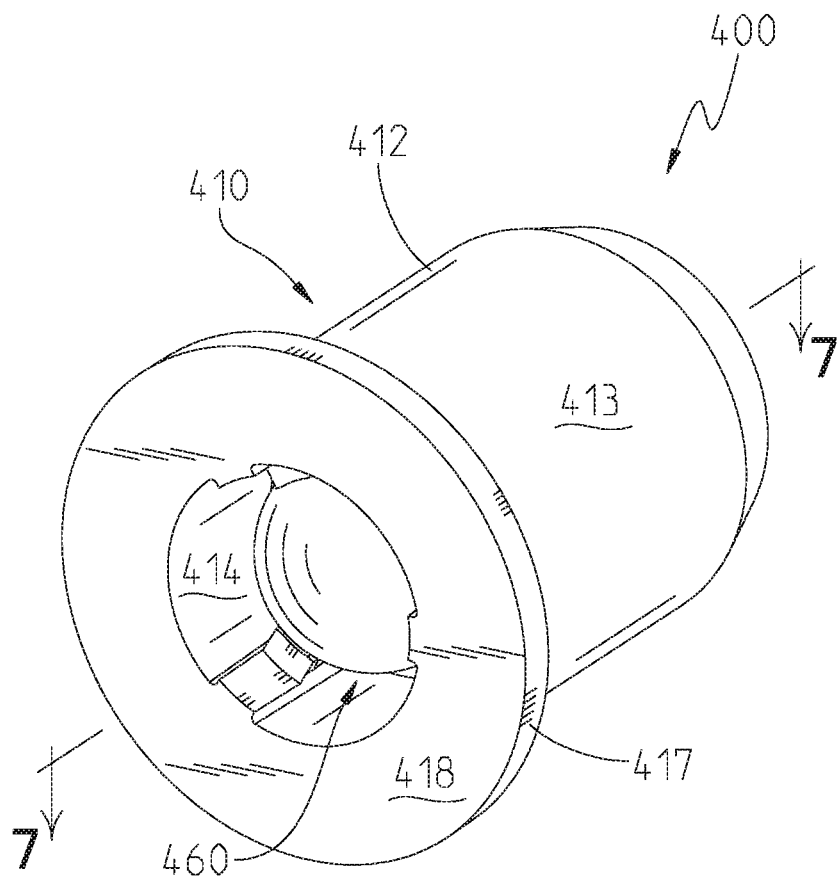
FIG. 5 is a perspective front view of the exemplary check valve assembly of FIG. 4.
Figure 6:
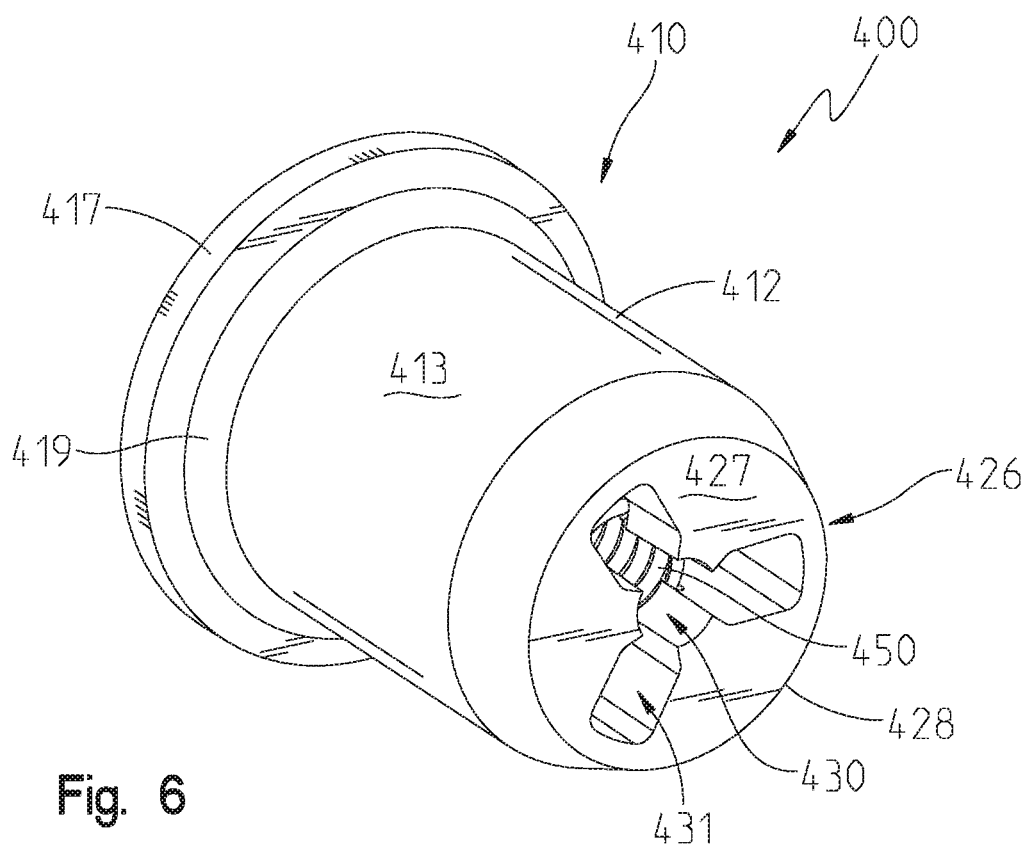
FIG. 6 is a perspective rear view of the exemplary check valve assembly of FIG. 4.

Turning now to FIGS. 3A and 3B, an exemplary selective coupler assembly 300 is shown. Selective coupler assembly 300 includes a selective coupler 308 having an engaged configuration and a disengaged configuration, an actuator assembly 310 including an actuator element 320 operatively coupled to selective coupler 308 to transition selective coupler 308 from the disengaged configuration to the engaged configuration, and a check valve assembly 330 coupled to actuator assembly 310.

Actuator assembly 310 further includes a housing 312. Housing 312 is illustratively coupled to a transmission component 304 along a base 313 of housing 312. In an alternative embodiment, housing 312 is coupled to transmission component 304 at a suitable location other than base 313. In another alternative embodiment, transmission component 304 is a stationary component, for example, a transmission housing. Actuator element 320, illustratively a piston, is received within a fluid cavity 314 of housing 312 for reciprocal movement within fluid cavity 314. That is, actuator element 320 is moveable relative to housing 312 in axial directions 302, 303. Actuator element 320 includes a distal portion 322, illustratively an axial protrusion in axial direction 303, that engages selective coupler 308 to transition selective coupler 308 from the disengaged configuration to the engaged configuration.

Actuator assembly 310 operates in a similar manner as the actuator assembly of FIG. 2. That is, fluid cavity 314 is fluidly coupled to a sump 331. When the fluid pressure of the fluid within fluid cavity 314 increases due to a pump 333 pumping fluid from sump 331, actuator element 320 is axially displaced in axial direction 303. Sufficient displacement of actuator element 320 in axial direction 303 results in distal portion 322 of actuator element 320 engaging selective coupler 308 to transition selective coupler 308 from the disengaged configuration to the engaged configuration. Conversely, a decrease in the fluid pressure of the fluid within fluid cavity 314 results in actuator element biasing member 323 displacing actuator element 320 in axial direction 302. In the exemplary embodiment shown, actuator element biasing member 323 is a compression spring that biases actuator element in axial direction 302. Sufficient displacement of actuator element 320 in axial direction 302 results in distal portion 322 disengaging and axially spacing apart from selective coupler 308. Once actuator element 320 has disengaged, selective coupler 308 transitions from the engaged configuration to the disengaged configuration.

In the exemplary embodiment of FIGS. 3A and 3B, check valve assembly 330 of selective coupler assembly 300 is coupled to a wall 316 bounding fluid cavity 314 of housing 312. Check valve assembly 330 includes a housing 332 having a fluid passageway 334 and a biasing member 336 supported by housing 332 for axial movement in axial directions 302, 303. Housing 332 of check valve assembly 330 is received within an opening 318 of wall 316 of housing 312 of actuator assembly 310. Fluid passageway 334 is in fluid communication with fluid cavity 314 of actuator assembly 310 and a second fluid cavity 306 fluidly coupled to sump 331. In an alternative embodiment, second fluid cavity 306 is a sump.

Check valve assembly 330 further includes a valve element 338 positioned within fluid passageway 334 and axially moveably in axial directions 302, 303 between a seated position and an unseated position. The exemplary embodiment of FIG. 3A illustrates valve element 338 of check valve assembly 330 in the unseated position. The exemplary embodiment of FIG. 3B illustrates valve element 338 in the seated position. When valve element 338 is in the seated position, fluid passageway 334 is closed and fluid cavity 314 of actuator assembly 310 is not in fluid communication with second fluid cavity 306. On the other hand when valve element 338 is in the unseated position, fluid passageway 334 is open and fluid cavity 314 of actuator assembly 310 is in fluid communication with second fluid cavity 306. Thus, valve element 338 controls a flow of fluid through check valve assembly 330 and between fluid cavity 314 of actuator assembly 310 and second fluid cavity 306. Valve element 338 is illustratively shown as a spherical ball, but may have alternative shapes.

Turning now to FIGS. 4-9B, an exemplary check valve assembly 400 is shown. Check valve assembly 400 includes a housing 410 having a fluid passageway 440, a biasing member 450 supported by the housing 410 for axial movement in axial directions 404, 405 (see FIG. 7) along a longitudinal axis 402, and a valve element 460 positioned within the fluid passageway 440 and axially moveable in axial directions 404, 405. In the exemplary embodiment of FIGS. 4-6, housing 410 further includes a first end 416 and a second end 426 spaced axially apart from first end 416 along longitudinal axis 402. Housing 410 also includes a body 412 extending axially between first end 416 and second end 426 along longitudinal axis 402. In the exemplary embodiment, body 412 has a generally cylindrical shape. An alternative body 412 may have a generally cuboidal shape or other suitable geometric shape permitting check valve assembly 400 to be received within a wall of an actuator assembly, as described above in connection with FIGS. 3A and 3B. In an alternative embodiment where check valve assembly 400 is used with a clutch, check valve assembly 400 may be received within a portion of a fluid passageway associated with the clutch. An advantage, among others, of positioning check valve assembly 400 within a stationary member when used with a rotating clutch is that air which has infiltrated the fluid cavity of the actuator element during non-operation of the multi-speed transmission may be exhausted while the clutch rotates during operation of the multi-speed transmission.

Figure 7:
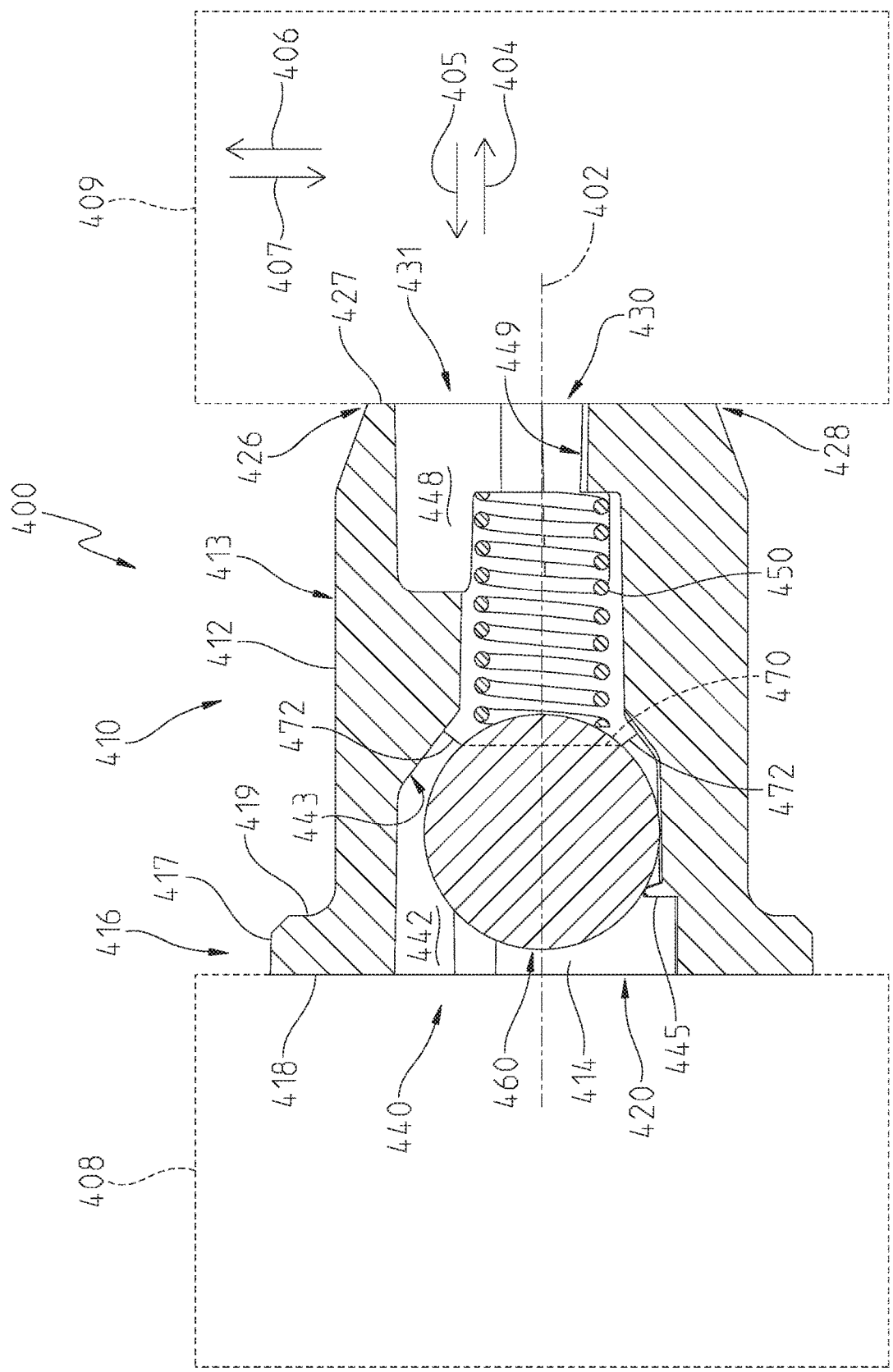
FIG. 7 is a cross-sectional view of the exemplary check valve assembly of FIG. 4 having a valve element in an unseated position and fluidly coupled to a first cavity and a second cavity.

Body 412 includes an exterior surface 413 and an interior wall 414. Interior wall 414 defines fluid passageway 440. Fluid passageway 440 is in fluid communication with first end 416 and second end 426 and extends through body 412 along longitudinal axis 402. First end 416 of housing 410 has a flange 417 including a first side 418 and a second side 419 opposite the first side 416. Flange 417 extends radially farther in radial direction 406 than exterior surface 413 of body 412, as illustrated in FIG. 7. In the exemplary embodiment shown, first side 418 of flange 417 is generally planar and orthogonal to longitudinal axis 402. In alternative embodiments, first side 418 of flange 417 may be convex or concave. First side 418 further includes a central opening 420 coaxial with longitudinal axis 402. Central opening 420 defines an entrance to fluid passageway 440 at first end 416. Body 412 extends longitudinally from second side 419 of flange 417 to second end 426 of check valve assembly 400 along longitudinal axis 402.

Second end 426 of housing 410 includes an end surface 427 generally planar and orthogonal to longitudinal axis 402. In an alternative embodiment, end surface 427 of second end 426 is convex or concave. In the illustrated embodiment, an outer perimeter 428 of end surface 427 is arranged radially between exterior surface 413 of body 412 and longitudinal axis 402. That is, body 412 tapers radially inwardly in radial direction 407 at second end 426. In an alternative embodiment, outer perimeter 428 is coradial with exterior surface 413 of body 412.

Second end 426 of housing 410 further includes a central opening 430 coaxial with longitudinal axis 402 and a plurality of openings 431 radially offset from central opening 430 in radial direction 406. In the exemplary embodiment shown in FIG. 6, plurality of openings 431 are equally and circumferentially spaced about and fluidly coupled to central opening 430. Central opening 430 and plurality of openings 431 define an entrance to fluid passageway 440 at second end 426. In an alternative embodiment, second end 426 includes a single central opening similar to central opening 420 of first end 416.

Turning now to FIG. 7, fluid passageway 440 includes a first chamber 442 and a second chamber 448 fluidly coupled to the first chamber 442. Second chamber 448 is arranged axially of first chamber 442 along longitudinal axis 402 in axial direction 404. In the exemplary embodiment shown, first chamber 442 and second chamber 448 cooperate to form fluid passageway 440. Additionally, first chamber 442 includes a seating surface 443 against which valve element 460 seats when valve element 460 is in a seated position, as described herein. In the exemplary embodiment shown, seating surface 443 comprises a generally flat surface angled relative to longitudinal axis 402. That is, seating surface 443 extends radially away from longitudinal axis 402 in radial direction 406 while extending in axial direction 405 along longitudinal axis 402. In an alternative embodiment, seating surface 443 comprises a radial protrusion extending radially inwardly from interior wall 414. In another alternative embodiment, seating surface 443 comprises a convex surface angled relative to longitudinal axis 402. In further embodiments, seating surface 443 is a gasket or seal carried by housing 410.

First chamber 442 of fluid passageway 440 includes a plurality of swages 444 extending radially inwardly from interior wall 414 in radial direction 407. While the exemplary embodiment includes three swages 444, it is contemplated that first chamber 442 includes fewer than three and more than three swages 444. Moreover in the exemplary embodiment shown, swages 444 are equally and circumferentially spaced about longitudinal axis 402. Therefore, swages 444 are illustratively spaced approximately 120 degrees apart about longitudinal axis 402. Additionally, swages 444 are illustratively axially set back in axial direction 404 from first side 418 of first end 416. In an alternative embodiment, a distal portion of swages 444 is coplanar with first side 418 of first end 416.

Swages 444 are configured to limit axial movement of valve element 460 along longitudinal axis 402 in axial direction 405. For example, swages 444 include a radial protrusion 445 extending radially inwardly from interior wall 414 of first chamber 442 in radial direction 407. Radial protrusion 445 is spaced axially apart from seating surface 443. In the exemplary embodiment shown, radial protrusion 445 is arranged axially intermediate first end 416 of housing 410 and seating surface 443. Furthermore, valve element 460 is arranged axially intermediate radial protrusion 445 and seating surface 443. Radial protrusion 445 engages an exterior surface 462 of valve element 460 thereby prohibiting valve element 460 from moving any further along longitudinal axis 402 in axial direction 405. That is, radial protrusion 445 acts as an axial stop for valve element 460 in axial direction 405.

The plurality of swages 444 are further configured to radially center valve element 460 about longitudinal axis 402 and to limit radial movement of valve element 460 in radial direction 406. For example, each of swages 444 includes a rib 446 extending radially inwardly from interior wall 414 of first chamber 442 in radial direction 407. The plurality of ribs 446 are sized to center valve element 460 about longitudinal axis 402. Moreover, each of ribs 446 limits radial movement of valve element 460 in radial direction 406, as illustrated in FIG. 7. In the exemplary embodiment shown, each of ribs 446 axially extends along longitudinal axis 402 from a radially distal portion of seating surface 443 to radial protrusion 445. Further, radial protrusions 445 extend further radially inwardly than ribs 446.

Housing 410 of check valve assembly 400 may be formed from a variety of manufacturing and machining processes known in the arts. For example, housing 410 may be formed using expendable mold casting, non-expendable mold casting, milling, grinding, and turning. In a preferred embodiment, housing 410 is formed from a die casting process. In the exemplary embodiment shown, housing 410 comprises a zinc alloy suitable for the die casting process. Housing 410, however, may comprise other ferrous and non-ferrous alloys suitable for a selected manufacturing and machining process. Additionally, while housing 410 is illustrated as a single piece in the exemplary embodiment shown, it is contemplated that housing 410 could be formed from a plurality of components coupled together.

In the exemplary embodiment shown, swages 444 are integrally coupled or formed with interior wall 414 of first chamber 442 of housing 410. Accordingly, ribs 446 are preferably, but not necessarily, formed during the same process used to form housing 410. An advantage, among others, of forming ribs 446 at the same time as housing 410 is that a secondary machining process to form ribs 446 is not needed. On the other hand, radial protrusions 445 are preferably formed using a secondary machining process after valve element 460 and biasing member 450 have been positioned within fluid passageway 440, as disclosed herein. In a preferred embodiment, radial protrusions 445 are formed using a cold working process such as swaging or stamping. That is, an axially distal portion of ribs 446 is cold worked to form radial protrusions 445. While the exemplary embodiment illustrates each pair of radial protrusions 445 and ribs 446 as a single component, it is contemplated that swages 444 could be formed from a plurality of components coupled together. For example, housing 410 could include only ribs 446 while radial protrusions 445 comprise a separate structure, such as an internal snap ring. It is also contemplated that swages 444 comprise a structure separate from housing 410 that is inserted into fluid passageway 440 before or after insertion of valve element 460 and biasing member 450.

Biasing member 450, illustratively a coil spring, is supported by interior wall 414 of housing 410 for axial movement along longitudinal axis 402 in axial directions 404, 405. Alternative embodiments of biasing member 450 include wave springs, Belleville washers, disc springs, volute springs, or other suitable biasing members. Biasing member 450 illustratively includes a first end 452 and a second end 454 opposite first end 452. In the embodiment shown, biasing member 450 extends longitudinally from first end 452 to second end 454 and is arranged coaxial with longitudinal axis 402. Interior wall 414 of housing 410 includes a shoulder 449 supporting at least a portion of second end 454 of biasing member 450. That is, shoulder 449 restrains second end 454 of biasing member 450 such that first end 452 of biasing member 450 is axially moveable in axial directions 404, 405 relative to second end 454. Shoulder 449 extends radially inwardly from interior wall 414 in radial direction 407. In the exemplary embodiment shown, shoulder 449 is positioned within second chamber 448 of fluid passageway 440.

Valve element 460 is positioned within first chamber 442 of fluid passageway 440 and is arranged axially intermediate first end 416 of housing 410 and seating surface 443 along longitudinal axis 402. Specifically, valve element 460 is arranged axially between first end 452 of biasing member 450 and first end 416 of housing 410. More specifically, valve element 460 is axially adjacent and contacts first end 452 of biasing member. Moreover, exterior surface 462 of valve element 460 is supported by first end 452 of biasing member 450. In an alternative embodiment, first end 452 of biasing member 450 is received within a recess of exterior surface 462 of valve element 460.

Biasing member 450 exerts a biasing force in axial direction 405 to bias valve element 460 in axial direction 405 away from seating surface 443. To this end, valve element 460 is axially moveable in axial directions 404, 405 between a seated position in which valve element 460 is contacting seating surface 443 and an unseated position in which valve element 460 is axially spaced apart from seating surface 443. In the exemplary embodiment shown, valve element 460 is illustratively a ball valve. An alternative valve element 460 may be implemented including butterfly valves, swing valves, tilting disc valves, lift valves, and other suitable valve elements. Valve element 460 illustratively comprises steel, but may comprise a ferrous or non-ferrous alloy suitable for use in a multi-speed transmission.

Figure 9A:
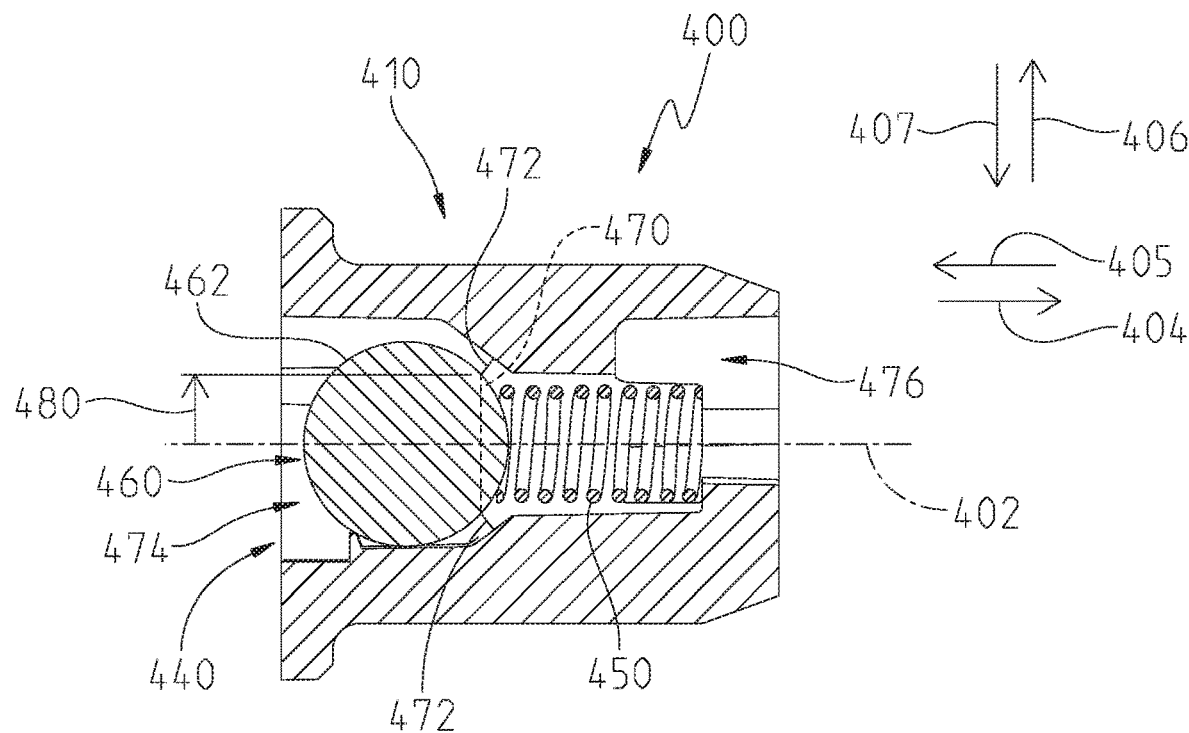
FIG. 9A is cross-sectional view of the exemplary check valve assembly of FIG. 4 with the valve element in the unseated position.
Figure 9B:
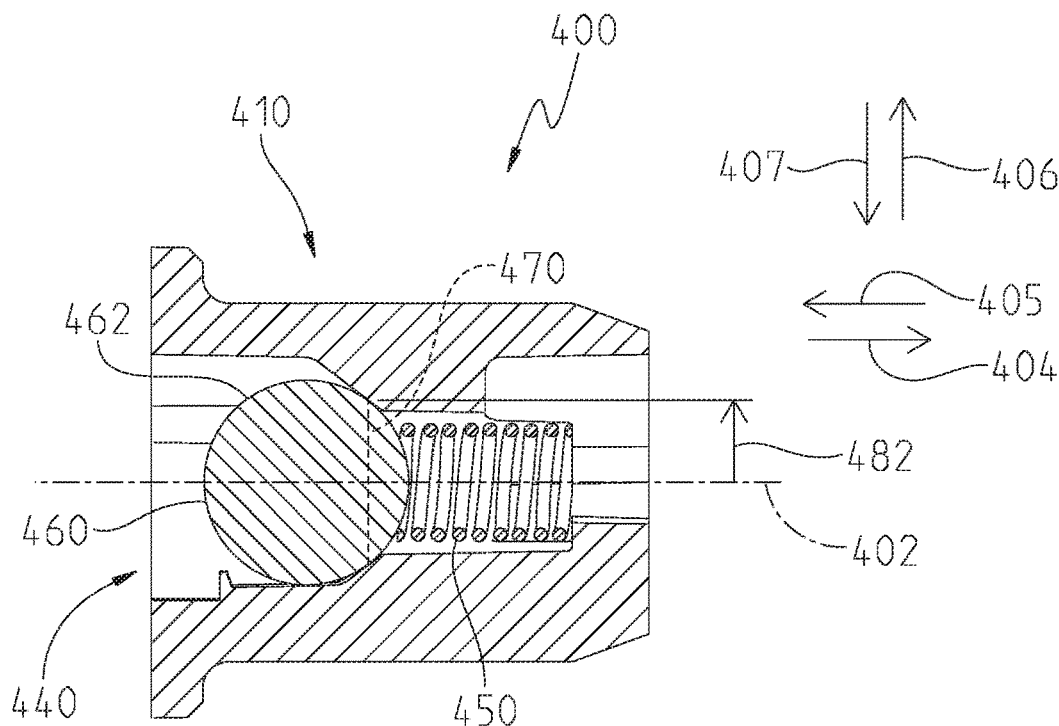
FIG. 9B is a cross-sectional view of the exemplary check valve assembly of FIG. 4 with the valve element in a seated position.

As further illustrated in FIG. 7, check valve assembly 400 is fluidly coupled to a first fluid cavity 408 at first end 416 of housing 410 and to a second fluid cavity 409 at second end 426 of housing 410. More specifically, fluid passageway 440 is in fluid communication with first fluid cavity 408 and second fluid cavity 409. When valve element 460 is in the unseated position, as illustrated in FIGS. 7 and 9A, fluid passageway 440 is open and fluid can flow through check valve assembly 400. Conversely when valve element 460 is in the seated position, as illustrated in FIG. 9B, fluid passageway 440 is closed and fluid cannot flow through check valve assembly 400. Thus, valve element 460 controls the flow of fluid through fluid passageway 440 of housing 410. As a result, check valve assembly 400 controls the flow of fluid from first fluid cavity 408 to second fluid cavity 409.

Check valve assembly 400 controls the flow of fluid in response to a fluid pressure of the fluid within first fluid cavity 408. More specifically, valve element 460 moves to the seated position in response to a seating pressure supplied by the fluid within first fluid cavity 408. As fluid is supplied to first fluid cavity 408, the fluid pressure with first fluid cavity 408 increases. When the fluid pressure exceeds the seating pressure, valve element 460 moves axially in axial direction 404 to the seated position. Specifically, the seating pressure is sufficient to overcome at least the biasing force supplied by biasing member 450 against valve element 460 in axial direction 405. In an exemplary embodiment, the seating pressure is between 4 and 8 pounds-force per square inch ("PSI").

When valve element 460 is in the seated position, valve element 460 contacts seating surface 443 and closes fluid passageway 440. Thus, fluid is prohibited from flowing through fluid passageway 440. In the exemplary embodiment shown in FIG. 9B, exterior surface 462 of valve element 460 tangentially contacts seating surface 443. It is contemplated, however, that exterior surface 462 of valve element 460 may contact at least a substantial portion of seating surface 443 when in the seated position. It is further contemplated that seating surface 443, in an alternative embodiment, may comprise a shape configured to mate with exterior surface 462 of valve element 460.

Conversely, valve element 460 moves from the seated position to the unseated position in response to an absence of the seating pressure supplied by the fluid within first fluid cavity 408. That is, if the fluid pressure within first fluid cavity 408 falls below the seating pressure, biasing member 450 biases valve element 460 in axial direction 405 from the seated position to the unseated position. In an exemplary embodiment, the opening pressure is between 4 and 8 PSI. In a preferred embodiment, the opening and seating pressure are equal. An advantage, among others, of having equal opening and seating pressures is the predictability and consistency in the opening and closing of check valve assembly 400. In an alternative embodiment, the opening and seating pressures are within 10 percent to 50 percent of each other. In another alternative embodiment, the opening and seating pressures are within 12 percent to 25 percent of each other. In a further alternative embodiment, the opening and seating pressures are within 1 to 2 PSI of each other.

Figure 8:
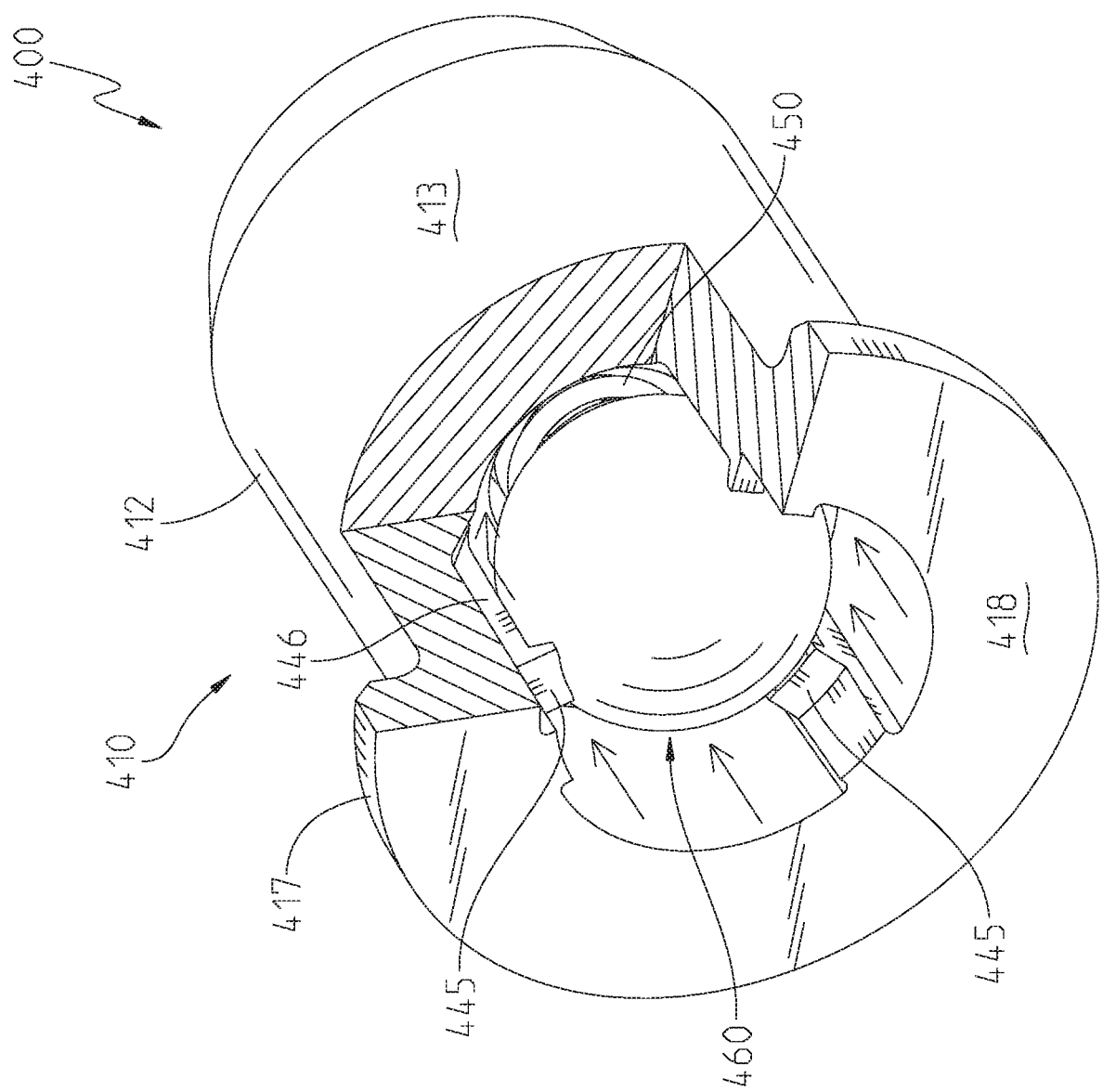
FIG. 8 is a partial sectional view of the exemplary check valve assembly of FIG. 4.

When valve element 460 is in the unseated position, valve element 460 is axially spaced apart from seating surface 443, as illustrated in FIG. 9A. Thus, fluid may flow through fluid passageway 440 in axial directions 404, 405 once valve element 460 is no longer contacting seating surface 443. For example, FIG. 8 illustrates fluid flow through fluid passageway 440 in axial direction 404. Axial movement of valve element 460 in axial direction 405 is arrested by swages 444. That is, exterior surface 462 of valve element 460 engages radial protrusion 445 of swages 444 and axially restrains valve element 460 from continuing to move in axial direction 405.

The operation of check valve assembly 400 is discussed in more detail with specific reference to FIGS. 7, 9A, and 9B. In the exemplary embodiment, a plane 470 normal to longitudinal axis 402 and intersecting exterior surface 462 of valve element 460 is shown. The intersection of plane 470 with exterior surface 462 defines a seating boundary of the valve element 460. When valve element 460 is in the seated position, valve element 460 contacts seating surface 443 at the seating boundary, as shown in FIG. 9B. Thus, a radial distance 480 from longitudinal axis 402 to the seating boundary in radial direction 406 is equal to a radial distance 482 from longitudinal axis 402 to seating surface 443 at the point of contact when the valve element is in the seated position. Additionally, the seating boundary defines a minimum distance 472 from seating surface 443 to valve element 460 when valve element 460 is in the unseated position, as shown in FIGS. 7 and 9A.

In a preferred embodiment, the seating boundary defines the true minimum distance from seating surface 443 to valve element 460 when valve element 460 is in the unseated position. That is, minimum distance 472 represents the shortest distance between exterior surface 462 of valve element 460 and seating surface 443. Thus, the seating boundary represents the closest point of valve element 460 to seating surface 443 when valve element 460 is in either of the seated or unseated positions. It is contemplated, however, that seating boundary may not define the true minimum distance due to, for example, the manufacturing tolerances of the selected manufacturing and machining process. Therefore in an alternate embodiment, the seating boundary defines a distance within 5 percent to 20 percent of the true minimum distance between seating surface 443 and exterior surface 462 of valve element 460. In another alternative embodiment, the seating boundary defines a distance within 10 percent of the true minimum distance between seating surface 443 and exterior surface 462 of valve element 460.

In comparing the unseated and seated positions of FIGS. 9A and 9B, the seating boundary travels with valve element 460 as valve element 460 moves in axial directions 404, 405. Therefore, while the seating boundary intersects the same point of exterior surface 462 of valve element 460, the value of minimum distance 472 decreases as valve element 460 moves in axial direction 404, with the value of minimum distance 472 equal to zero when valve element 460 contacts seating surface 443 in the seated position. Conversely, the value of minimum distance 472 increases as valve element 460 moves in axial direction 405, with the largest value of minimum distance 472 occurring when valve element 460 is fully unseated and restrained by radial protrusions 445. In the exemplary embodiment shown, the minimum distance between exterior surface 462 of valve element 460 and seating surface 443 is 0.5 millimeters when valve element 460 is in the unseated position. In an alternative embodiment, the minimum distance is between 0.3 millimeters and 0.5 millimeters. It is contemplated, however, that the minimum distance could be less than 0.3 millimeters and greater than 0.5 millimeters.

Additionally, minimum distance 472 defines a flow restriction within fluid passageway 440 as fluid flows in axial direction 404. As a result, a first flow region 474 exists within fluid passageway 440 in axial direction 405 of minimum distance 472 and a second flow region 476 exists within fluid passageway 440 in axial direction 404 of minimum distance 472. This flow restriction induces a pressure differential between first flow region 474 and second flow region 476. That is, the fluid pressure of the fluid in first flow region 474 is higher than the fluid pressure of the fluid in second flow region 476 when fluid flows through fluid passageway 440 in axial direction 404. This pressure differential, in conjunction with the pressure differential between first fluid cavity 408 and second fluid cavity 409, results in valve element 460 moving in axial direction 404 from the unseated position to the seated position. In a preferred embodiment, the fluid pressure of the fluid in the first flow region 474 is approximately equal to the seating pressure when valve element 460 is in the unseated position and beginning to axially displace in axial direction 404. In another preferred embodiment, the fluid pressure of the fluid in second flow region 476 is approximately zero when valve element 460 is in the unseated position.

First flow region 474 has a first cross-sectional flow area and second flow region 476 has a second cross-sectional flow area. Further, the flow restriction defined by minimum distance 472 has a flow restriction cross-sectional area. Each of these cross-sectional flow areas are transverse to longitudinal axis 402 in radial direction 406. In the exemplary embodiment shown, both of fluid passageway 440 and valve element 460 have a generally circular transverse cross-sectional area. Therefore, the flow restriction has a flow restriction cross-sectional flow area in the shape of an annulus. It is contemplated, however, that at least one of first flow region 474, second flow region 476, fluid passageway 440, and valve element 460 may comprise a non-circular cross-sectional area. In the exemplary embodiment shown, each of the first and second cross-sectional flow areas are larger than the flow restriction cross-sectional flow area. As a result, the flow restriction and the pressure differential between first flow region 474 and second flow region 476 occurs at minimum distance 472.

In one embodiment where check valve assembly 400 is used with a selective coupler assembly such as the one disclosed herein in connection with FIGS. 3A and 3B, the fluid pressure of the fluid within first fluid cavity 408 is maintained between 3 and 5 PSI when the selective coupler is in the disengaged configuration. When the fluid pressure of the fluid within first fluid cavity 408 is pressurized to a fluid cavity fill pressure, any air that may have infiltrated first fluid cavity 408 during non-operation of the multi-speed transmission is exhausted through check valve assembly 400. For example, the fluid cavity fill pressure is between 2 and 4 PSI, which is less than the seating pressure in this embodiment. As a result, the infiltrated air may be exhausted as valve element 460 is not in the seated position. If the infiltrated air is not exhausted upon startup of the multi-speed transmission, the displacement of the actuator element and the transition of the selective coupler from the disengaged configuration to the engaged configuration may be inconsistent and unpredictable. Once the infiltrated air has been fully exhausted from first fluid cavity 408, some of the fluid within first fluid cavity 408 may continue to pass through check valve assembly 400 as a small leak. This leak is of a sufficiently small size as to be managed by the pump pumping the fluid to first fluid cavity 408.

In order to displace the actuator element to transition the selective coupler from the disengaged configuration to the engaged configuration, the fluid pressure of the fluid within first fluid cavity 408 is increased to the seating pressure of check valve assembly 400, for example, 8 PSI. When the fluid pressure of the fluid within first fluid cavity 408 reaches the seating pressure, valve element 460 is axially displaced to the seated position and the fluid within fluid cavity cannot pass through check valve assembly 400. In some situations, a spike in the fluid pressure of the fluid within first fluid cavity 408 may occur once valve element 460 is in the seated position. This spike in the fluid pressure occurs because fluid is no longer flowing through check valve assembly 400.

Once valve element 460 is in the seated position, the fluid pressure of the fluid within first fluid cavity 408 is further increased to an actuator element displacement pressure. At such a pressure within first fluid cavity 408, the actuator element is axially displaced to transition the selective coupler from a disengaged configuration to an engaged configuration. For example, the actuator element displacement pressure is 10 PSI. An advantage, among others, of having an actuator element displacement pressure higher than the seating pressure is that any spike in the fluid pressure of the fluid within first fluid cavity 408 when valve element 460 seats will not cause an already axially displacing actuator element to suddenly displace quicker. As a result, the selective coupler will not engage sooner than expected and shifting consistency is preserved for the multi-speed transmission.

In order to transition the selective coupler from the engaged configuration to the disengaged configuration, the fluid pressure of the fluid within first fluid cavity 408 is reduced below the actuator element displacement pressure. Once the fluid pressure within first fluid cavity 408 is below the actuator element displacement pressure, an actuator element biasing member displaces the actuator element away from the selective coupler such that it is transitioned from the engaged configuration to the disengaged configuration. The fluid pressure of the fluid within first fluid cavity 408 may be further reduced below the seating pressure of check assembly valve 400. Reducing the fluid pressure within first fluid cavity 408 results in biasing member 450 biasing valve element 460 from the seated position to the unseated position. If the fluid pressure within first fluid cavity 408 is reduced below the seating pressure, then the fluid pressure will be maintained at the fluid cavity fill pressure until the selective coupler needs to be transitioned from the disengaged configuration to the engaged configuration. If the fluid pressure within fluid cavity 408 is not further reduced, then the first fluid cavity 408 is maintained at or slightly above the seating pressure and below the actuator element displacement pressure until the selective coupler needs to be transitioned from the disengaged configuration to the engaged configuration.

Figure 10:
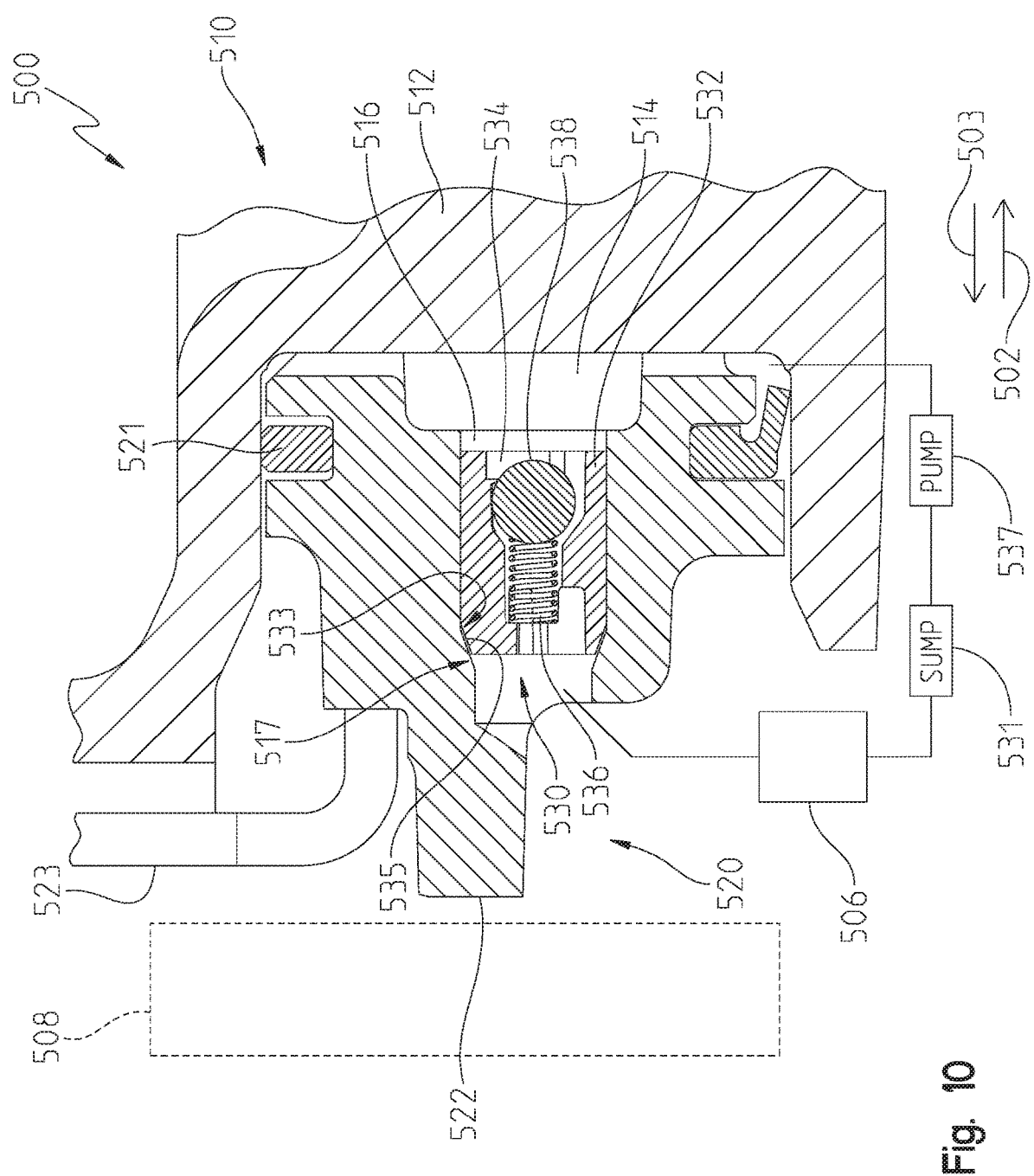
FIG. 10 is a cross-sectional view of an exemplary selective coupler assembly with another exemplary check valve assembly having a valve element in an unseated position.

Turning now to FIG. 10, another exemplary selective coupler assembly 500 is shown. Selective coupler assembly 500 includes a selective coupler 508 having an engaged configuration and a disengaged configuration, an actuator assembly 510 including an actuator element 520 operatively coupled to selective coupler 508 to transition selective coupler 508 from the disengaged configuration to the engaged configuration, and an exemplary check valve assembly 530 coupled to the actuator element 520.

Actuator assembly 510 further includes a housing 512, which may be coupled to or integrally formed with a transmission component. For example, in one embodiment, housing 512 may be coupled to a stationary component such as a transmission housing. In an alternative embodiment, housing 512 may be coupled to a rotating transmission component. Actuator element 520, illustratively a piston, is received within a fluid cavity 514 of housing 512 for reciprocal movement within fluid cavity 514. That is, actuator element 520 is moveable relative to housing 512 in axial directions 502, 503. Actuator element 520 includes a distal portion 522, illustratively an axial protrusion in axial direction 503, that engages selective coupler 508 to transition selective coupler 508 from the disengaged configuration to the engaged configuration. In addition, actuator element 520 illustratively includes a seal 521 for sealing actuator element 520 to fluid cavity 514 of housing 512.

Actuator assembly 510 operates in a similar manner as the actuator assembly of FIGS. 2, 3A, and 3B. That is, fluid cavity 514 is fluidly coupled to a sump 531. When the fluid pressure of the fluid within fluid cavity 514 increases due to a pump 537 pumping fluid from sump 531, actuator element 520 is axially displaced in axial direction 503. Sufficient displacement of actuator element 520 in axial direction 503 results in distal portion 522 of actuator element 520 engaging selective coupler 508 to transition selective coupler 508 from the disengaged configuration to the engaged configuration. Conversely, a decrease in the fluid pressure of the fluid within fluid cavity 514 results in an actuator element biasing member 523 displacing actuator element 520 in axial direction 502. In the exemplary embodiment shown, actuator element biasing member 523 is a compression spring that biases actuator element in axial direction 502. Sufficient displacement of actuator element 520 in axial direction 502 results in distal portion 522 disengaging and axially spacing apart from selective coupler 508. Once actuator element 520 has disengaged, selective coupler 508 transitions from the engaged configuration to the disengaged configuration.

Check valve assembly 530 of selective coupler assembly 500 is housed within an interior chamber 516 of actuator element 520. In an alternative embodiment, check valve assembly 530 may be integrally formed with actuator element 520. Check valve assembly 530 includes a housing 532 having a fluid passageway 534, a biasing member 536 supported by housing 532 for axial movement in axial directions 502, 503 within fluid passageway 534, and a valve element 538 positioned within fluid passageway 534 and axially moveable in axial directions 502, 503. Fluid passageway 534 is in fluid communication with fluid cavity 514 of actuator assembly 510 and a second fluid cavity 506 fluidly coupled to sump 531. In an alternative embodiment, second fluid cavity 506 is a sump.

In the exemplary embodiment shown, housing 532 includes interface features 533, illustratively chamfered surface 535, which interfaces with a complementary surface 517 of interior chamber 516 to seat check valve assembly 530 within interior chamber 516 of actuator element 520. Moreover, when the fluid pressure of the fluid within fluid cavity 514 increases, the fluid pressure biases check valve assembly 530 against interior chamber 516, and pump 537 will seal check valve assembly 530 against complementary surface 517 of interior chamber 516. In an alternative embodiment, check valve assembly 530 may include a seal for sealing the interface between housing 532 and interior chamber 516. In addition to providing a seating and sealing surface for check valve assembly 530, complementary surface 517 acts as an insertion stop during insertion of check valve assembly 530 into actuator element 520.

The interface between check valve assembly 530 and interior chamber 516 may be a slip fit or an interference fit connection. If the interface is a slip fit connection, interior chamber 516 may be staked in one or more locations to axially retain check valve assembly 530 within interior chamber 516. That is, check valve assembly 530 will be axially retained intermediate complementary surface 517 and the staked portion of interior chamber 516. Alternatively, a retainer may be friction fit within interior chamber 516 to axially retain check valve assembly 530 within interior chamber 516.

Check valve assembly 530 includes the same interior structure and operates in a similar manner as exemplary check valve assembly 400 of FIGS. 4-9B. More specifically, valve element 538 of check valve assembly 530 is axially moveable in axial directions 502, 503 between a seated position and an unseated position shown in FIG. 10. When valve element 538 is in the seated position, fluid passageway 534 is closed and fluid cavity 514 of actuator assembly 510 is not in fluid communication with second fluid cavity 506. On the other hand when valve element 538 is in the unseated position, fluid passageway 534 is open and fluid cavity 514 of actuator assembly 510 is in fluid communication with second fluid cavity 506. Thus, valve element 538 controls a flow of fluid through check valve assembly 530 and between fluid cavity 514 of actuator assembly 510 and second fluid cavity 506. Biasing member 536, illustratively a coil spring, biases valve element 538 in axial direction 502 to the unseated position. Valve element 538 is illustratively shown as a spherical ball, but may have alternative shapes.

Figure 11:
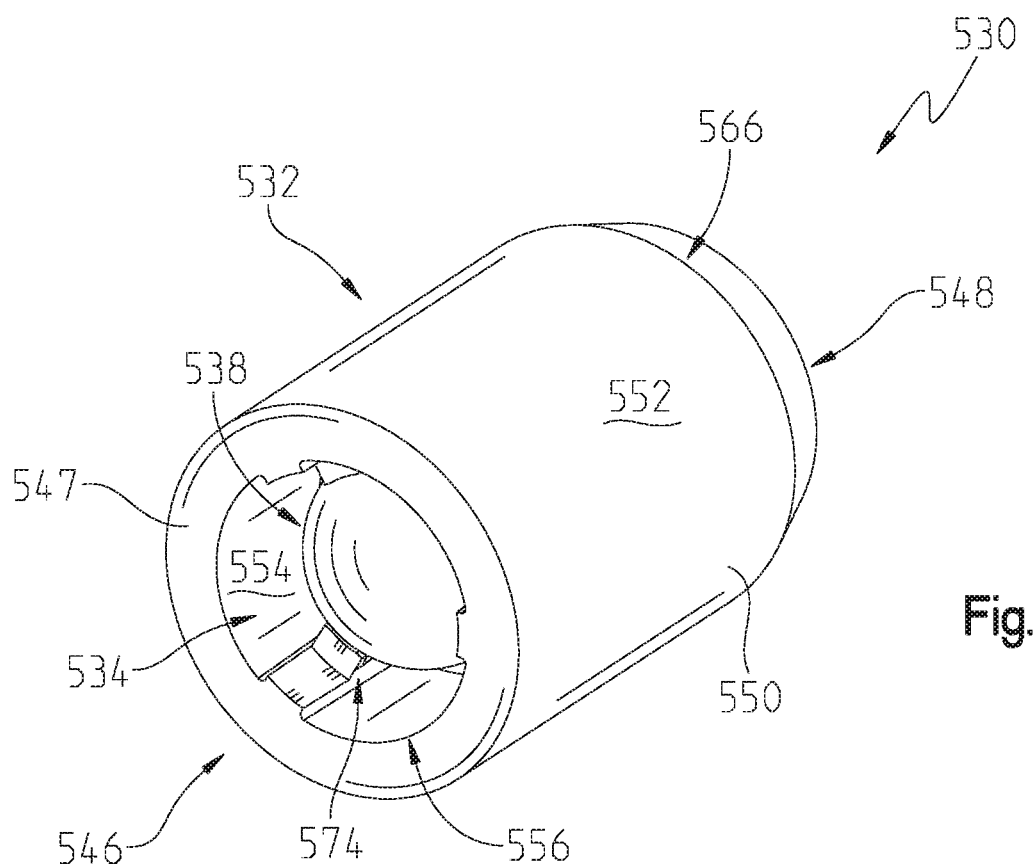
FIG. 11 is a perspective front view of the exemplary check valve assembly of FIG. 10.
Figure 12:
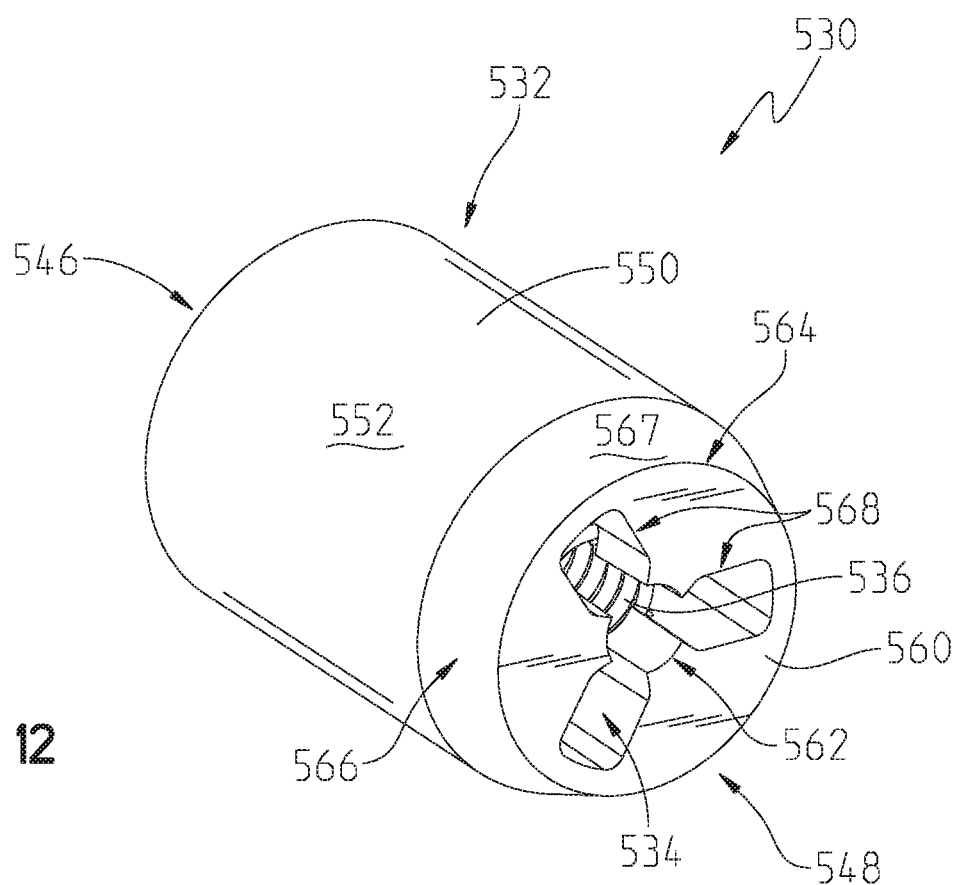
FIG. 12 is a perspective rear view of the exemplary check valve assembly of FIG. 10.

Turning now to FIGS. 11 and 12, check valve assembly 530 is shown in more detail. Housing 532 includes a first end 546 and a second end 548 spaced axially apart from first end 546. A body 550 extends axially between first end 546 and second end 548. In the exemplary embodiment shown, body 550 has a generally cylindrical shape. An alternative body 550 may have a generally cuboidal shape or other suitable geometric shape permitting check valve assembly 530 to be received within a component of an actuator assembly. In an alternative embodiment where check valve assembly 530 is used with a clutch, check valve assembly 530 may be received within a portion of a fluid passageway associated with the clutch. An advantage, among others, of positioning check valve assembly 530 within a stationary member when used with a rotating clutch is that air which has infiltrated the fluid cavity of the actuator element during non-operation of the multi-speed transmission may be exhausted while the clutch rotates during operation of the multi-speed transmission.

Body 550 includes an exterior surface 552 and an interior wall 554. Interior wall 554 defines fluid passageway 534, which is in fluid communication ends 546, 548 and extends through body 550. Interior wall 554 of body 550 also includes a plurality of swages 574 extending radially inwardly from interior wall 554 and configured to axially retain valve element 538 within fluid passageway 534. In the exemplary embodiment shown, first end 546 includes an end surface 547 that is generally planar and orthogonal to fluid passageway 534 and includes a central opening 556 defining an entrance to fluid passageway 534.

Second end 548 of housing 532 includes an end surface 560 generally planar and orthogonal to fluid passageway 534. In an alternative embodiment, end surface 560 is convex or concave. In the illustrated embodiment, end surface 560 includes a central opening 562 and an outer perimeter 564 arranged radially between exterior surface 552 of body 550 and central opening 562. That is, body 550 tapers radially inwardly towards central opening 562 at second end 548 to define an interfacing feature 566, illustratively a chamfer 567, for interfacing with a complementary surface of the component of the actuator assembly in which alternative check valve assembly 530 is received. In an alternative embodiment, interfacing feature 566 may comprise another shape or structure for interfacing with the complementary surface such as, for example, a flange or shoulder.

End surface 560 includes a plurality of openings 568 radially offset from central opening 562. In the exemplary embodiment shown, openings 568 are equally and circumferentially spaced about and fluidly coupled to central opening 562. Central opening 562 and openings 568 define an entrance to fluid passageway 534 at second end 548. In an alternative embodiment, central opening 562 includes a single central opening similar to central opening 556 of first end 546.

Housing 532 may be formed from a variety of manufacturing and machining processes known in the arts. For example, housing 532 may be formed using expendable mold casting, non-expendable mold casting, milling, grinding, and turning. In a preferred embodiment, housing 532 is formed from a die casting process. In the exemplary embodiment shown, housing 532 comprises a zinc alloy suitable for the die casting process. Housing 532, however, may comprise other ferrous and non-ferrous alloys suitable for a selected manufacturing and machining process. Additionally, while housing 532 is illustrated as a single piece in the exemplary embodiment shown, it is contemplated that housing 532 could be formed from a plurality of components coupled together.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission comprising:
   a stationary component;
   a rotatable component configured to rotate relative to the stationary component; and
   a selective coupler having an actuator element axially moveable relative to the stationary component between a disengaged position and an engaged position, wherein:
      a first fluid cavity is formed on a first side of the stationary component,
      a second fluid cavity is formed on a second, opposing side of the stationary component and between the stationary component and the actuator element,
      such that a fluid flow from the first fluid cavity to the second fluid cavity is operable to urge the actuator element into the engaged position to rotatably fix the rotatable component relative to the stationary component; and
   a check valve assembly for controlling the flow of fluid in the transmission from the first fluid cavity to the second fluid cavity, the check valve assembly comprising:
      a housing received in an aperture formed in the stationary component and including a fluid passageway fluidly coupled to the first fluid cavity and the second fluid cavity;
      a biasing member supported by the housing for axial movement along a first axis; and
      a valve element positioned within the fluid passageway of the housing and axially moveable between a seated position in which the valve element is contacting a seating surface of the fluid passageway and the first fluid cavity is not in fluid communication with the second fluid cavity and an unseated position in which the valve element is spaced apart from the seating surface of the fluid passageway and the first fluid cavity is in fluid communication with the second fluid cavity,
      wherein an intersection of a plane normal to the first axis and the valve element defines a seating boundary of the valve element, the seating boundary of the valve element defining a minimum distance from the seating surface of the fluid passageway to the valve element when the valve element is in the unseated position and the seating boundary contacting the seating surface of the fluid passageway when the valve element is in the seated position.

2. The transmission of claim 1, wherein the fluid passageway further includes a first flow region and a second flow region arranged axially of the first flow region along the first axis in a first axial direction, the first flow region having a first flow area, the second flow region having a second flow area, and the minimum distance from the seating surface to the valve element defining a flow restriction within the fluid passageway having a flow restriction area, wherein each of the first flow area and the second flow area is larger than the flow restriction area.

3. The transmission of claim 2, wherein the flow restriction induces a pressure differential between the first flow region and the second flow region when the fluid flow is in the first axial direction.

4. The transmission of claim 2, wherein the biasing member is supported by the housing within the second flow region.

5. The transmission of claim 1, wherein the valve element comprises a ball valve.

6. The transmission of claim 1, wherein the housing further includes a plurality of swages extending radially inwardly from an interior wall of the fluid passageway and configured to radially center and limit axial travel of the valve element along the first axis in a second axial direction.

7. The transmission of claim 6, wherein the plurality of swages are integrally coupled to the interior wall.

8. The transmission of claim 6, wherein the plurality of swages comprises three swages circumferentially spaced about the first axis.

9. The transmission of claim 1, wherein the seating surface comprises a generally flat surface angled relative to the axis.

10. The transmission of claim 1, wherein the valve element tangentially contacts the seating surface at the seating boundary when the valve element is in the seated position.

11. The transmission of claim 1, wherein the biasing member comprises a coiled spring.

12. The transmission of claim 1, wherein the housing of the check valve assembly is located at a top portion of the stationary component, whereby air which has infiltrated the fluid cavity of the actuator element during non-operation of the multi-speed transmission may be exhausted while the clutch rotates during operation of the multi-speed transmission.

13. The transmission of claim 1, wherein the selective coupler comprises a plurality of friction discs engaged with one another by contact with the actuator element in the engaged position, and a disc biasing member urging the friction discs to disengage from one another when the actuator element is spaced from the friction discs in the disengaged position.

14. The transmission of claim 13, wherein the biasing member of the check valve assembly is configured to actuate prior to actuation of the disc biasing member of the selective coupler as a fluid pressure of the fluid flow increases, such that fluid flow from the first fluid cavity to the second fluid cavity actuates the valve element of the check valve assembly before actuating the actuator element and the plurality of friction discs.

15. A transmission comprising:
   a stationary component;
   a rotatable component configured to rotate relative to the stationary component;
   a selective coupler having a plurality of friction discs selectively engageable with one another, an actuator element axially moveable relative to the stationary component between a disengaged position in which the actuator element is spaced from the friction discs and an engaged position in which the friction discs are engaged with one another by contact with the actuator element, wherein:
      a first fluid cavity is formed on a first side of the stationary component,
      a second fluid cavity is formed on a second, opposing side of the stationary component and between the stationary component and the actuator element,
      such that a fluid flow from the first fluid cavity to the second fluid cavity is operable to urge the actuator element into the engaged position to rotatably fix the rotatable component relative to the stationary component; and
   a disc biasing member urging the friction discs to disengage from one another; and a check valve assembly for controlling a flow of fluid in a transmission, the check valve assembly comprising:
   a housing including a first chamber and a second chamber, the second chamber fluidly coupled to the first chamber and arranged axially of the first chamber along a first axis of the housing, the first chamber and the second chamber defining a fluid passageway of the housing;
   a biasing member supported by the housing for axial movement along the first axis, the biasing member configured to actuate prior to actuation of the disc biasing member of the selective coupler as a fluid pressure of the fluid flow increases, such that fluid flow from the first fluid cavity to the second fluid cavity actuates the valve element of the check valve assembly before actuating the actuator element and the plurality of friction discs;
   a valve element positioned within the first chamber and axially moveable in a first axial direction along the first axis to a seated position in which the valve element is contacting a seating surface of the first chamber and moveable in a second axial direction along the first axis, opposite the first axial direction, to an unseated position in which the valve element is spaced axially apart from the seating surface; and
   at least one swage extending radially inwardly from an interior wall of the first chamber, the at least one swage configured to limit axial movement of the valve element along the first axis in the second axial direction.

16. The transmission of claim 15, wherein the check valve assembly includes three swages arranged circumferentially about the first axis.

17. The transmission of claim 16, wherein each of the three swages is further configured to radially center the valve element about the first axis.

18. The transmission of claim 15, wherein the at least one swage includes a rib extending radially inwardly from the interior wall, the rib limiting radial movement of the valve element.

19. The transmission of claim 15, wherein the at least one swage includes a radial protrusion extending radially inwardly from the interior wall, the radial protrusion axially spaced apart from the seating surface and limiting axial movement of the valve element along the first axis in the second axial direction, the valve element arranged axially intermediate the radial protrusion of the at least one swage and the seating surface.

20. The transmission of claim 15, wherein the housing of the check valve assembly is fixed to the stationary component.

21. The transmission of claim 20, wherein the housing is located at a top portion of the stationary component, whereby air which has infiltrated the fluid cavity of the actuator element during non-operation of the multi-speed transmission may be exhausted while the clutch rotates during operation of the multi-speed transmission.

* * * * *